US010574639B2

(12) United States Patent
Katoh

(10) Patent No.: US 10,574,639 B2
(45) Date of Patent: Feb. 25, 2020

(54) AUTHENTICATION APPARATUS UTILIZING PHYSICAL CHARACTERISTIC

(71) Applicant: Panasonic Intellectual Property Management Co., Ltd., Osaka (JP)

(72) Inventor: Yoshikazu Katoh, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 381 days.

(21) Appl. No.: 15/595,976

(22) Filed: May 16, 2017

(65) Prior Publication Data
US 2017/0346800 A1 Nov. 30, 2017

(30) Foreign Application Priority Data

May 25, 2016 (JP) ................................ 2016-104728

(51) Int. Cl.
 *H04L 29/06* (2006.01)
 *G06F 21/44* (2013.01)
 (Continued)

(52) U.S. Cl.
 CPC ............ *H04L 63/065* (2013.01); *G06F 21/44* (2013.01); *G06F 21/73* (2013.01); *H04L 9/0866* (2013.01);
 (Continued)

(58) Field of Classification Search
 CPC ... H04L 63/065; H04L 9/0866; H04L 9/3278; H04L 63/08; H04L 2463/102;
 (Continued)

(56) References Cited

U.S. PATENT DOCUMENTS 7,291,507 B2 * 11/2007 Bidermann ........... H01L 23/544
  257/48
8,386,801 B2 *  2/2013 Devadas ................. G06F 21/31
  713/189
(Continued)

FOREIGN PATENT DOCUMENTS

JP 2012-043517 3/2012
JP 2013-545340 12/2013
(Continued)

OTHER PUBLICATIONS

Counterfeit Integrated Circuits: A Rising Threat in the Global Semiconductor Supply Chain, Ujjwal Guin, IEEE, 2014, vol. 102 (Year: 2014).*

(Continued)

*Primary Examiner* — Farid Homayounmehr
*Assistant Examiner* — Sanchit K Sarker
(74) *Attorney, Agent, or Firm* — McDermott Will & Emery LLP

(57) ABSTRACT

An authentication apparatus includes: a combination information generator that generates first combination information indicating a combination of physical characteristics of at least two of first elements included in a first semiconductor device; a group identification information generator that generates first group identification information based on the combination of the physical characteristics of the at least two of the first elements, the first group identification information being for identifying the first semiconductor device as belonging to a same group as another semiconductor device manufactured in a same process; a transmitter that transmits the first combination information to an authentication partner; a receiver that receives second group identification information that the authentication partner generates in accordance with the first combination information; and an information verifier that compares the first group (Continued)

identification information with the second group identification information.

16 Claims, 23 Drawing Sheets

(51) Int. Cl.
*H04L 9/08* (2006.01)
*G06F 21/73* (2013.01)
*H04L 9/32* (2006.01)

(52) U.S. Cl.
CPC ............ *H04L 9/3278* (2013.01); *H04L 63/08* (2013.01); *H04L 2209/12* (2013.01); *H04L 2463/102* (2013.01)

(58) Field of Classification Search
CPC ..... H04L 2209/12; G06F 21/44; G06F 21/73; G11C 13/0021; G11C 13/0059; H01L 27/24
USPC .............................................. 726/6
See application file for complete search history.

(56) References Cited

U.S. PATENT DOCUMENTS

| | | | |
|---|---|---|---|
| 9,124,432 B2* | 9/2015 | Nagai | H04L 9/0869 |
| 2003/0204743 A1* | 10/2003 | Devadas | G06F 21/31 |
| | | | 726/9 |
| 2012/0044777 A1 | 2/2012 | Fujiwara et al. | |
| 2013/0129083 A1 | 5/2013 | Fujino | |
| 2013/0194886 A1 | 8/2013 | Schrijen et al. | |
| 2015/0227738 A1 | 8/2015 | Katoh | |
| 2017/0346800 A1* | 11/2017 | Katoh | G06F 21/44 |

FOREIGN PATENT DOCUMENTS

| | | | | |
|---|---|---|---|---|
| JP | 5724305 | * | 5/2015 | ............... H04L 9/10 |
| WO | 2003/090259 | | 10/2003 | |
| WO | 2006/003711 | | 1/2006 | |
| WO | 2012/014291 | | 2/2012 | |
| WO | 2014/132664 | | 9/2014 | |

OTHER PUBLICATIONS

Sanu K. Mathew et al., "A 0.19pJ/b PVT-Variation-Tolerant Hybrid Physically Unclonable Function Circuit for 100% Stable Secure Key Generation in 22nm CMOS", ISSCC2014, Feb. 11, 2014.

* cited by examiner

AUTHENTICATION APPARATUS UTILIZING PHYSICAL CHARACTERISTIC

BACKGROUND

1. Technical Field

The present disclosure relates to an authentication apparatus and an authentication method.

2. Description of the Related Art

Markets for electronic commerce services, such as Internet banking and Internet shopping, offered over the Internet are growing rapidly. Electronic money is used as a method of payment for such services, and use of integrated circuit (IC) cards and smartphone terminals utilized as media for the payment is also increasing. In such services, a higher level of security technology is always required for mutual authentication in communication and encryption of communication data in order to ensure security during the payment. With the advent of Internet of Things (IoT) in recent years, a large number of semiconductor devices and a large number of apparatuses using semiconductor devices connect to each other and thus need to perform authenticity determination each other to mutually authenticate that they are authentic devices. However, ICs used in devices in terminals need to be low in cost, and thus, advanced countermeasures against physical tampering cannot be taken in many cases.

With respect to software technology, program-processing encryption technologies centered around advanced encryption algorithms have been accumulated, and a sufficient level of security has been achieved. However, with advances in technology, the possibility that information in circuits is directly read from outside is increasing rapidly, and it is known that, when ICs are manufactured at low cost, countermeasures against physical tampering become insufficient, as described above, and internal information is easily stolen (e.g., refer to International Publication No. 2012/014291 (hereinafter referred to as "Patent Document 1")).

In recent years, in order to overcome the above-described problems, physically unclonable function (PUF) technologies have been proposed (e.g., refer to Japanese Unexamined Patent Application Publication (Translation of PCT Application) No. 2013-545340 (hereinafter referred to as "Patent Document 2")), Japanese Unexamined Patent Application Publication No. 2012-43517 (hereinafter referred to as "Patent Document 3"), and "A 0.19 pJ/b PVT-Variation-Tolerant Hybrid Physically Unclonable Function Circuit for 100% Stable Secure Key Generation in 22 nm CMOS" Sanu K. Mathew, et al., ISSCC2014 (hereinafter referred to as "Non-Patent Document 1"). The PUF technologies are technologies for generating unique individual identification information that differs from one IC from another by utilizing variations in manufacture.

SUMMARY

One non-limiting and exemplary embodiment provides an authentication apparatus that performs more appropriate authentication.

In one general aspect, the techniques disclosed here feature an authentication apparatus that includes: a combination information generator that generates first combination information indicating a combination of physical characteristics of at least two of first elements included in a first semiconductor device; a group identification information generator that generates first group identification information based on the combination of the physical characteristics of the at least two of the first elements, the first group identification information being for identifying the first semiconductor device as belonging to a same group as another semiconductor device manufactured in a same process; a transmitter that transmits the first combination information to an authentication partner; a receiver that receives second group identification information that the authentication partner generates in accordance with the first combination information; and an information verifier that compares the first group identification information with the second group identification information.

The authentication apparatus in the non-limiting and exemplary embodiment in the present disclosure can perform more appropriate authentication.

It should be noted that general or specific embodiments may be implemented as a device, an apparatus, a system, a method, a computer program, a recording medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION (Knowledge Underlying Present Disclosure)

Figure 1:
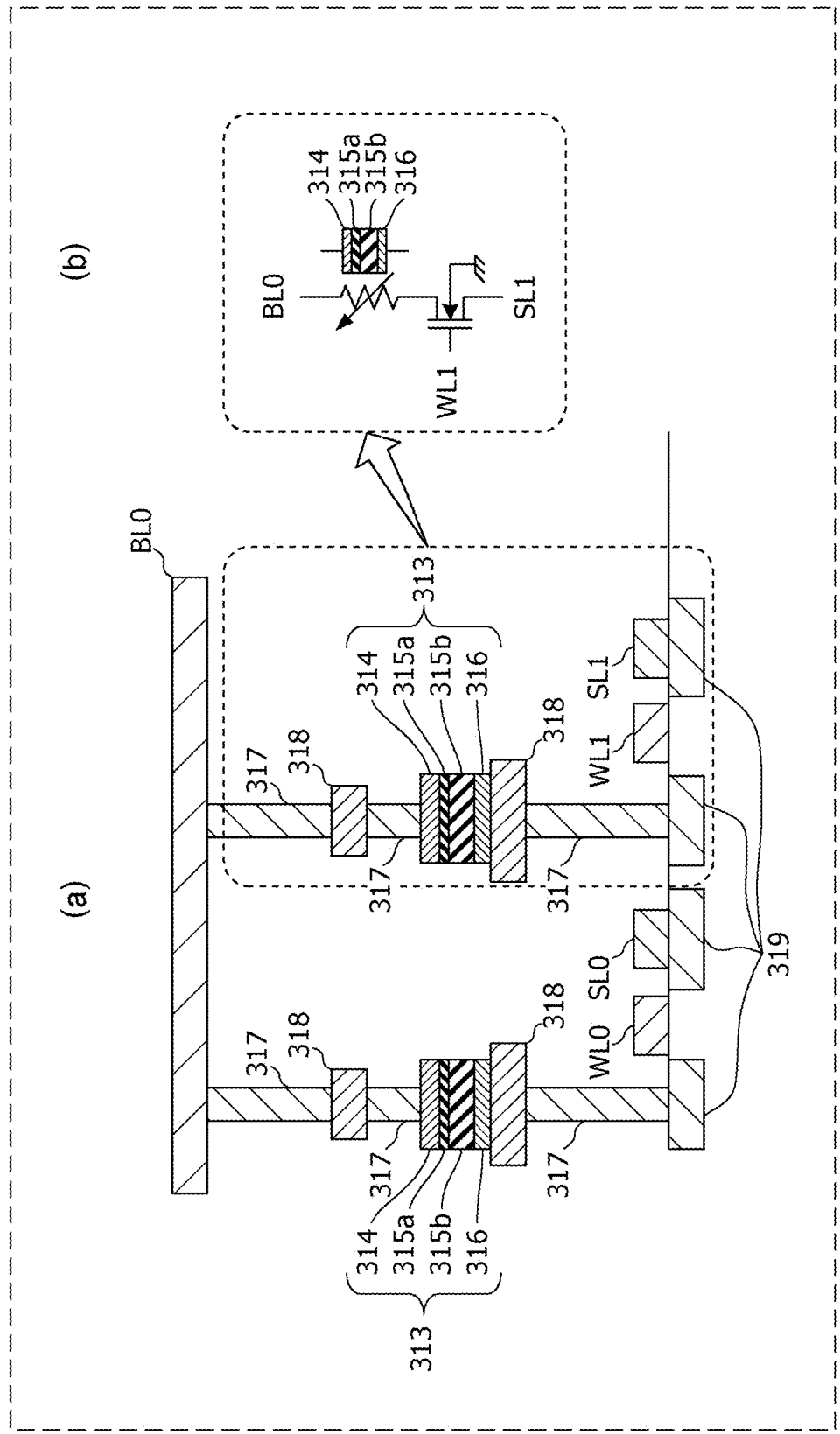
FIG. 1 is a diagram illustrating a cross section of memory cells using resistance variable elements in an embodiment and a circuit diagram representation of one of the memory cells.

The present disclosure relates to a novel authentication apparatus and an authentication method that allow only semiconductor devices (hereinafter may be referred to simply as "devices") manufactured in the same process to authenticate each other without certification by a third-party organization. First, a description will be given of a security technology using cryptographic keys of related art as disclosed in Patent Document 1 and so on. In general, ICs having enhanced security utilize cryptographic circuits included therein to encrypt sensitive information, thereby preventing information leakage. In this case, it is essential to ensure that information of cryptographic keys (also called "secret keys") held in the ICs do not leak to outside.

The Triple Data Encryption Standard (3DES) and the Advanced Encryption Standard (AES) are widely used as typical schemes for the cryptographic circuits. These cryptographic schemes employ advanced cryptographic algorithms with which a cryptographic key cannot be identified within a realistic time even when a pair of plaintext (i.e., pre-encryption data), which is an input, and cyphertext, which is an output, is obtained and is analyzed by making full use of a fastest computer, and the system security has been proven. Thus, encrypted data is protected by computational security.

In general, a secret key is pre-written into ICs in a manufacturing process thereof under a facility environment where the security is ensured, and is pre-shared between the ICs. When the ICs having the pre-shared secret key are adapted to be able to authenticate each other through exchange of cyphertext, it is possible to eliminate impersonation and imitation of non-authentic ICs that cannot know the secret key. For example, when an authenticating side encrypts random-number data by using a secret key and transmits the encrypted secret key to a side to be authenticated. The side to be authenticated decrypts the encrypted random-number data by using the pre-shared secret key to restore the random-number data to the original random-number data and returns the random-number data to the authenticating side. The authenticating side checks whether or not the returned random-number data matches the random-number data used in the encryption. This ensures that the side to be authenticated has the secret key. Hence, the authenticating side authenticates that the side to be authenticated is an authentic subject. However, even when encrypted data is supposed to be secure against hacking, the advancement of attacking techniques in recent years has been causing concern that cryptographic keys are vulnerable against direct hacking.

For ICs based on classic schemes, cryptographic keys are stored in internal fuse ROMs or nonvolatile memories. In a configuration using an internal fuse ROM, there is a problem in that stored key information is hacked by monitoring the state of a fuse element and analyzing electrical continuity and discontinuity of the fuse element through use of X-ray projection or the like. In a configuration using a nonvolatile memory, although the state of the nonvolatile memory is not analyzed using X-ray projection, there is a problem in that an attacker can hack key information by directly applying a probe across two opposite ends of a memory element in the nonvolatile memory to electrically read the state of the memory element. Accordingly, ICs having enhanced security are manufactured using a most-advanced microfabrication process so that a probe cannot be directly applied to the internal circuits of the ICs. That is, ICs have been manufactured using a microfabrication process having a rule of narrower wires than the diameter of the leading end of a probe employing the latest technology, to thereby avoid threats of analysis using probing. Use of an advanced process makes it difficult to perform analysis using probing or optical observation. However, if variants of IC that are not produced in large quantity are manufactured using an advanced process, the cost increases, resulting in loss of product competitiveness. Conversely, when the ICs are manufactured using an old process with which the manufacturing cost is low, resistance to physical tampering becomes insufficient, thus making it difficult to realize both.

In addition, a scheme called a side-channel attack has begun to be used recently, which has been considered to be a threat. As described in Patent Document 1, the "side-channel attack" is a scheme for identifying a cryptographic key by using side-channel information about power consumed by a semiconductor device during operation of each signal processing circuit, radiation electromagnetic waves that depend on the power consumed, and so on. The reason why this scheme is a threat is that an attacker (i.e., a hacker) can hack the key information during actual operation without physically damaging ICs.

Differential power analysis (DPA), which is classified into such a side-channel attack, was introduced by P. Kocher in 1999. This DPA scheme utilizes the existence of a correlation between a signal value or a signal transition frequency during an IC operation and power consumption. More specifically, the DPA scheme identifies key information by integrating such a correlation a large number of times and deriving a fixed pattern via machine learning control while eliminating noise. Patent Document 1 discloses an example in which key information is identified based on the operation of a cryptographic processing circuit. Key information stored in a nonvolatile memory is read at a timing triggered by executing cryptographic processing. In consideration of the principle of the DPA, when data read at a timing similar to the timing at which the key information is read can be identified and acquired, there is a possibility that the contents of the data are analyzed by the DPA. When internal specifications of an IC leak, a hacker comprehends a method for controlling the IC, all data stored in the nonvolatile memory in the manner described above, together with cryptographic key information, are hard-copied, and a clone of the IC is created.

In recent years, PUF technologies have been proposed in order to overcome the problems described above. PUF technologies are technologies in which variations in manufacture are utilized to generate unique individual identification information that differs from one IC to another. Hereinafter, individual identification information generated using a PUF technology is referred to as "PUF individual identification information". The PUF individual identification information can be said to be random-number data that is unique to each device and that is associated with variations in physical characteristics of ICs.

Such unique individual identification information that differs from one device to another is surely information that cannot be duplicated, but when an attempt is made to perform authentication by using the information, it is necessary to have a third-party organization verify whether or not individual identification information to be authenticated is information of an authentic subject. Now, one specific example will be described assuming that one IC (referred to as an "IC-A" in this case) is to be authenticated. Before the IC-A is manufactured in a manufacturing process, individual identification information of the IC-A is registered with a third-party organization. When an authenticator is to authenticate device A, the authenticator obtains PUF individual identification information of the IC-A from a database of the third-party organization and compares the PUF individual identification information obtained from the database of the third-party organization with PUF individual identification information obtained from the IC-A. By doing so, the authenticator authenticates that the IC-A is a pre-registered authentic IC. Such a scheme requires a system that allows the authenticator to access the database in any time and is thus not suitable for an environment where individual appliances are locally connected, like an environment needed for IoT.

One example of related technology for generating the PUF individual identification information is a static random-access memory (SRAM)—PUF, like those described in Patent Document 2 and Non-Patent Document 1. Those examples employ a phenomenon in which, in each memory cell in an SRAM, whether default digital data when power therefor is turned on is likely to have the state of 1 or the state of 0 differs depending mainly on Vt variations (i.e., variations in an operation voltage) in a transistor. This phenomenon is unique to each cell in an SRAM included in each IC and thus differs from one cell to another. That is, the default data when power for the SRAM is turned on is used as the PUF individual identification information.

Patent Document 3 discloses a modification of SRAM-PUF and uses a phenomenon in which defective bits in memory cells in an SRAM occur randomly. In addition, Patent Document 1 introduces a scheme in which PUF individual identification information is generated using a PUF technology called an arbiter PUF or a glitch PUF. The arbiter PUF uses a phenomenon in which, owing to gate delay or wire delay, an output of a combination circuit changes randomly in response to an input. The gate delay and wire delay that change owing to variations in manufacture become unique delays in each IC. Accordingly, each IC outputs a substantially equal result in response to an input, although the result differs from one IC to another, and thus it is possible to generate PUF individual identification information.

Thus, in the PUF technologies in the preceding examples, the PUF individual identification information that is a unique random number for each IC is generated as data that cannot be duplicated. However, in order to authenticate an IC by using the PUF individual identification information, certification by a third-party organization is needed in any case. That is, the information cannot be used for authentication between local appliances that cannot access a database in a network server or the like. Accordingly, the present inventor has invented a scheme in the present disclosure.

In short, the PUF individual identification information generated using of the PUF technologies in the preceding examples is unique information that differs from one IC to another, as described above. Thus, certification indicating whether the PUF individual identification information of each IC is an authentic registered information needs to be obtained from a third-party organization whose security is ensured. That is, the authentication cannot be completed between only two parties, that is, an authenticating party and a party to be authenticated, thus requiring certification by a third party, and the authenticator needs to have a means for communicating with the third party. For authentication between local appliances, a means for communicating with a third party cannot be obtained in many cases, and for example, adding a function of connecting to the Internet and so on leads to an increase in cost, thus losing advantages of the appliances.

Accordingly, the non-limiting and exemplary embodiment in the present disclosure provides a function that can only be physically duplicated by a specific manufacturer having a specific manufacturing process and provides a novel authentication apparatus that allows only devices manufactured in the same process to authenticate each other without certification by a third-party organization.

An authentication apparatus according to one aspect of the present disclosure includes: a combination information generator that generates first combination information indicating a combination of physical characteristics of at least two of first elements included in a first semiconductor device; a group identification information generator that generates first group identification information based on the combination of the physical characteristics of the at least two of the first elements, the first group identification information being for identifying the first semiconductor device as belonging to a same group as another semiconductor device manufactured in a same process; a transmitter that transmits the first combination information to an authentication partner; a receiver that receives second group identification information that the authentication partner generates in accordance with the first combination information; and an information verifier that compares the first group identification information with the second group identification information.

Thus, the illustrative authentication apparatus according to the present disclosure obtains physical characteristics exhibited by at least two of elements in a semiconductor device manufactured in a specific manufacturing process owned by a specific manufacturer and generates the first group identification information by using a combination of the physical characteristics. Also, based on the same combination information as that of the authentication apparatus, the authentication partner obtains physical characteristics exhibited by at least two of elements in a semiconductor device at the authentication partner side and generates the second group identification information by using a combination of the physical characteristics. The authentication apparatus compares the first group identification information with the second group identification information to authenticate that the semiconductor device at the authentication partner side is a device manufactured in the same process (i.e., is a device belonging to the same group) as the semiconductor device at the authentication apparatus side (i.e., is a device belonging to the same group).

Thus, according to the present disclosure, it is possible to provide a group of authentication apparatuses that are difficult to physically clone. In addition, the authentication can be performed using a rule of whether or not a plurality of semiconductor devices are manufactured in the same process (i.e., belongs to the same group). Hence, unlike the PUF technologies in the preceding examples, it is not necessary to register individual identification information in a database in advance. This also does not require certification by a third-party organization during authentication, so that local appliances in the age of IoT can be easily authenticated at low cost.

That is, the present disclosure provides a function that can only be physically duplicated by a manufacturer having a specific manufacturing process and realizes a novel authentication apparatus that allows only devices manufactured in the same process to authenticate each other without certification by a third-party organization. A function with which authentication of a group of authentication apparatuses can be performed by using a rule of whether or not the authentication apparatuses have semiconductor devices manufactured in the same process is defined as a "group authentication PUF". The semiconductor devices may have the same structure. That is, in a process other than the specific process, characteristics that are the same as those in the specific process cannot be realized, and it is difficult to manufacture elements that are physically the same as elements manufactured in the specific process. Hence, the elements manufactured in the specific process cannot be cloned.

The authentication apparatus may further include an aggregate-characteristic detector that detects a first aggregate characteristic obtained by combining the physical characteristics of the at least two of the first elements in accordance with the first combination information generated by the combination information generator. The group identification information generator may generate the first group identification information, based on the first aggregate characteristic detected by the aggregate-characteristic detector.

The receiver may further receive second combination information generated by the authentication partner. The aggregate-characteristic detector further may detect a second aggregate characteristic obtained by combining physical characteristics of at least two of the first elements in accordance with the second combination information received by the receiver. The group identification information generator may further generate third group identification information based on the second aggregate characteristic, the third group identification information being for identifying the first semiconductor device as belonging to the same group as the other semiconductor device manufactured in the same process. The transmitter may further transmit the third group identification information to the authentication partner.

This realizes an authentication apparatus that not only functions as a master apparatus but also functions as a slave apparatus.

The authentication apparatus may further include: an error correction circuit that generates error correction data for correcting error in the first group identification information and that corrects the error in the first group identification information by using the error correction data; and a cryptographic circuit that generates a cryptographic key based on the first group identification information and that encrypts or decrypts data by using the cryptographic key.

This makes it possible to share the cryptographic key simultaneously with authentication using a group authentication PUF.

The first semiconductor device may be a nonvolatile resistive memory including resistance variable elements as the first elements. The authentication apparatus may have an authentication master function to authenticate the authentication partner and an authentication slave function to be authenticated. In the authentication master function, the combination information generator may generate first random-number data to be written to the nonvolatile resistive memory as the first combination information. After the first random-number data generated by the combination information generator is written to the nonvolatile resistive memory, the aggregate-characteristic detector may detect a first combined resistance of resistance characteristics of at least two of the resistance variable elements as the first aggregate characteristic. The group identification information generator may generate first digital data as the first group identification information, based on the first combined resistance. The transmitter may transmit the first random-number data to the authentication partner. The receiver may receive second digital data as the second group identification information that the authentication partner generates in accordance with the first random-number data. The information verifier may verify a match between the first digital data and the second digital data. In the authentication slave function, the receiver may receive, from the authentication partner, second random-number data to be written to the nonvolatile resistive memory as the second combination information. After the second random-number data received by the receiver is written to the nonvolatile resistive memory, the aggregate-characteristic detector may detect a second combined resistance of resistance characteristics of at least two of the resistance variable elements as the second aggregate characteristic. The group identification information generator may generate third digital data as the third group identification information, based on the second combined resistance. The transmitter may further transmit the third digital data to the authentication partner When one apparatus has both the authentication master function and the authentication slave function, a circuit may be shared to generate the second digital data and the third digital data.

This realizes an authentication apparatus that can perform group authentication in which the aforementioned device is a nonvolatile memory including a plurality of resistance variable elements.

The group identification information generator may generate the first digital data as the first group identification information, based on a transition of the first combined resistance in at least two portions in the nonvolatile resistive memory and may generate the third digital data as the third group identification information, based on a transition of the second combined resistance in at least two portions in the nonvolatile resistive memory. The transition of the combined resistance in this case may be a transition of changes in data correlated with combined resistances when a plurality of different combinations of at least two memory cells are selected.

With this arrangement, since group identification information is generated based on a transition of a plurality of combined resistances, it is possible to realize an authentication apparatus having higher security than a case in which group identification information is generated based on one combined resistance.

The information verifier may verify the match by calculating a Hamming distance between the first digital data and the second digital data.

Thus, a match between the first digital data and the second digital data is verified in the simple processing of calculating the Hamming distance.

Each of the resistance variable elements may have three states including (a) an initial state in which the resistance variable element has a resistance value within a predetermined resistance-value range, (b) a high-resistance state in which the resistance variable element has a resistance value that is smaller than the resistance value in the initial state and that is within a predetermined resistance-value range, and (c) a low-resistance state in which the resistance variable element has a resistance value that is smaller than the resistance value in the high-resistance state and that is within a predetermined resistance-value range. Each of the resistance variable elements may be adapted to reversibly change between the high-resistance state and the low-resistance state upon application of a predetermined voltage pulse. At least one of the resistance variable elements related to the first or second combined resistance may be in the initial state.

With this arrangement, since a combined resistance for the resistance variable element in the initial state, which is a significantly high resistance state, is used as the aggregate characteristic, a main selection cell becomes a memory cell in the initial state, thus enhancing the detection sensitivity of current flowing through a sub conduction path. The combined resistance of a group of sub selected memory cells are detected with a higher sensitivity.

The authentication apparatus may further include a selecting circuit. The aggregate-characteristic detector may comprise a reading circuit. The nonvolatile resistive memory may include memory cells each of which includes one of the resistance variable elements and a selector electrically connected to the resistance variable element. The selector may have a first selection terminal, a second selection terminal, and a third selection terminal and may control an amount of current flowing between the first selection terminal and the second selection terminal in accordance with a potential of the third selection terminal. Each of the resistance variable elements may have a first terminal and a second terminal and may have a resistance value that changes according to a value of a voltage applied across the first terminal and the second terminal and an application direction of the applied voltage. The first selection terminal of the selector may be connected to the second terminal of the resistance variable element. The nonvolatile resistive memory may include bit lines and pairs of source lines and word lines that intersect the bit lines, each pair comprising one source line and one word line. The memory cells may be arranged to correspond to areas where the pairs of source lines and word lines intersect the bit lines. In each of the memory cells, the first terminal of the resistance variable element may be connected to the corresponding bit line, the second terminal of the selector may be connected to the corresponding source line, and the third selection terminal may be connected to the corresponding word line. The selecting circuit may select at least one of the bit lines, may select at least two of the word lines, and may apply a voltage to each of the selected at least two word lines. The reading circuit may directly or indirectly measure an amount of current flowing from the selected at least one bit line to at least two source lines corresponding to the selected at least two word lines, and may detect the first or second combined resistance, based on a result of the measurement.

This realizes an authentication apparatus for a nonvolatile resistive memory belonging to type A in which source lines and word lines intersect bit lines.

The authentication apparatus may further include a selecting circuit. The aggregate-characteristic detector may comprise a reading circuit. The nonvolatile resistive memory may include memory cells each of which includes one of the resistance variable elements and a selector electrically connected to the resistance variable element. The selector may include a first selection terminal, a second selection terminal, and a third selection terminal and may control an amount of current flowing between the first selection terminal and the second selection terminal in accordance with a potential of the third selection terminal. Each of the resistance variable elements may have a first terminal and a second terminal and may have a resistance value that changes according to a value of a voltage applied across the first terminal and the second terminal and an application direction of the applied voltage. The first selection terminal of the selector may be connected to the second terminal of the resistance variable element. The nonvolatile resistive memory may include pairs of bit lines and source lines, each pair comprising one bit line and one source line arranged parallel to each other, and word lines that intersect the pairs of bit lines and source lines. The memory cells are arranged to correspond to areas where the word lines intersect the pairs of bit lines and source lines. In each of the memory cells, the first terminal of the resistance variable element may be connected to the corresponding bit line, the second terminal of the selector may be connected to the corresponding source line, and the third selection terminal may be connected to the corresponding word line. The nonvolatile resistive memory may further include a first short circuit that interconnects at least two of the bit lines according to a first predetermined combination, a second short circuit that interconnects at least two of the source lines according to a second predetermined combination, and a third short circuit that connects the at least two of the bit lines to the at least two of the source lines according to a third predetermined combination. The selecting circuit may select at least one of the bit lines and may apply a predetermined voltage to at least one of the word lines. The reading circuit may directly or indirectly measure an amount of current flowing from the selected at least one bit line to at least one source line corresponding to the selected at least one bit line, and may detect the first or second combined resistance, based on a result of the measurement.

This realizes an authentication apparatus for a nonvolatile resistive memory belonging to type B in which word lines intersect bit lines and source lines that are parallel to each other.

The nonvolatile resistive memory may include memory cells. Each of the memory cells may include a first electrode, a second electrode, and a resistance variable element having a resistance change layer located between the first electrode and the second electrode. The resistance change layer may have a state of providing insulation between the first electrode and the second electrode.

The resistance change layer may have a conduction path that penetrates the resistance change layer. The resistance change layer may be made of material containing a metal oxide. The resistance change layer may be made of material containing an oxygen-deficient metal oxide. The metal oxide may be at least one selected from the group consisting of a transition metal oxide and an aluminum oxide. The metal oxide may be at least one selected from the group consisting of a tantalum oxide, a hafnium oxide, and a zirconium oxide. The conduction path may have an oxygen-deficient metal oxide having a lower oxygen content than the resistance change layer.

Another authentication apparatus according to the present disclosure includes: a second semiconductor device including a plurality of second elements; a receiver that receives second combination information generated by an authentication partner; a group identification information generator that generates second group identification information based on a combination of physical characteristics of at least two of the second elements, the second group identification being for identifying the second semiconductor device as belonging to a same group as another semiconductor device manufactured in a same process, the combination corresponding to the second combination information; and a transmitter that transmits the second group identification information to the authentication partner.

This realizes an authentication apparatus corresponding to a slave apparatus. That is, the present disclosure provides a function that can only be physically duplicated by a manufacturer having a specific manufacturing process and realizes a novel authentication apparatus that allows only devices manufactured in the same process to authenticate each other without certification by a third-party organization.

The authentication apparatus may further include an aggregate-characteristic detector that detects a second aggregate characteristic obtained by combining the physical characteristics of the at least two of the second elements in accordance with the second combination information. The group identification information generator may generate the second group identification information, based on the second aggregate characteristic detected by the aggregate-characteristic detector.

An authentication method according to one aspect of the present disclosure includes: generating first combination information indicating a combination of physical characteristics of at least two of first elements included in a first semiconductor device; generating first group identification information based on the combination of the physical characteristics of the at least two of the first elements, the first group identification information being for identifying the first semiconductor device as belonging to a same group as another semiconductor device manufactured in a same process; transmitting the first combination information to an authentication partner; receiving the second group identification information that the authentication partner generates in accordance with the first combination information; and comparing the first group identification information with the second group identification information. This offers advantages that are similar to those of the above-described authentication apparatus.

The authentication method may further include: receiving second combination information generated by the authentication partner; generating a third group identification information based on a combination of physical characteristics of at least two of the first elements, the third group identification information being for identifying the first semiconductor device as belonging to the same group as the other semiconductor device manufactured in the same process, the combination corresponding to the received second combination information; and transmitting the third group identification information to the authentication partner.

This realizes an authentication method that not only provides functions of a master apparatus but also provides functions of a slave apparatus.

The authentication method may further include: generating error correction data for correcting error in the first group identification information and correcting the error in the first group identification information by using the error correction data; and generating a cryptographic key based on the first group identification information and encrypting or decrypting data by using the cryptographic key.

This makes it possible to share the cryptographic key simultaneously with authentication using a group authentication PUF.

Another authentication method according to one aspect of the present disclosure is an authentication method using a second semiconductor device including second elements. The authentication method includes: receiving second combination information generated by an authentication partner; generating second group identification information based on a combination of physical characteristics of at least two of the second elements, the second group identification being for identifying the second semiconductor device as belonging to a same group as another semiconductor device manufactured in a same process, the combination corresponding to the second combination information; and transmitting the second group identification information to the authentication partner. This realizes an authentication method for the slave apparatus.

Embodiment

An embodiment of an authentication apparatus and so on according to the present disclosure will be described below with reference to the accompanying drawings. In the present embodiment, a physical characteristic based on which PUF-group identification information used for authentication is generated is a nonlinear resistance characteristic of resistance variable elements. However, the physical characteristic in the present disclosure is not limited to the nonlinear resistance characteristic. The present disclosure relates to all authentication apparatuses that use an aggregate characteristic based on arbitrary combination information of physical characteristics. In the present embodiment, a physical characteristic used for authentication is a resistance characteristic of resistance variable elements, and a description will be particularly given of an example of a nonvolatile resistive memory in which resistance variable elements are generally used.

FIG. 1 is a diagram illustrating a cross section (FIG. 1(a)) of memory cells using resistance variable elements and a circuit diagram representation (FIG. 1(b)) of one of the memory cells. Source/drain regions 319 are arranged on a semiconductor substrate, and transistors that serve as selection elements are formed in order to select memory cells. In FIG. 1(a), BL0 indicates a zeroth bit line, WL0 indicates a zeroth word line, WL1 indicates a first word line, SL0 indicates a zeroth source line, and SL1 indicates a first source line. It can be understood from FIG. 1 that the word lines WL0 and WL1 and the source lines SL0 and SL1 intersect the bit line BL0 so as to be orthogonal thereto by using a different wiring layer. In FIG. 1(a), reference numeral 317 indicates plug layers, and reference numeral 318 indicates metal wiring layers. In this case, nonvolatile storage elements used for storing information are resistance variable elements 313 in which resistance values change according to a voltage that applies electrical stress and an application direction of the voltage.

As illustrated in FIG. 1, each resistance variable element 313 is formed between the metal wiring layer 318 that is the second layer (i.e., the lower layer) and the metal wiring layer 318 that is the third layer (i.e., the upper layer). Each resistance variable element 313 has a first electrode layer 316 formed on the second metal wiring layer 318, a second electrode layer 314, and a variable resistance layer 315 interposed between the first electrode layer 316 and the second electrode layer 314 to serve as a resistance change layer. That is, each resistance variable element 313 has a first electrode (the first electrode layer 316), a second electrode (the second electrode layer 314), and a resistance change layer (the variable resistance layer 315) interposed between the first electrode and the second electrode. The resistance change layer has a state of providing insulation between the first electrode and the second electrode. This "insulation state" refers to a state in which a resistance value is larger than a resistance range of a resistance value in an HR state described below.

In the present embodiment, by way of example, the variable resistance layer 315 is constituted by a first tantalum-containing layer 315b (hereinafter referred to as a "first tantalum oxide layer" or simply as a "first oxide layer") having a low oxygen content and a second tantalum-containing layer 315a (hereinafter referred to as a "second tantalum oxide layer" or simply as a "second oxide layer") formed on the first tantalum oxide layer 315b and having a high oxygen content. Since it is sufficient that the variable resistance layer 315 be constituted by two layers having different oxygen contents in oxygen-deficient resistance change materials, the base material thereof is not limited to tantalum. At least one selected from the group consisting of transition metal and aluminum (Al) can be used as other metal included in the resistance change layers. Examples of the transition metal include tantalum (Ta), titanium (Ti), hafnium (Hf), zirconium (Zr), niobium (Nb), tungsten (W), nickel (Ni), and iron (Fe). Since the transition metal can take a plurality of oxidation states, different resistance states can be realized with an oxidation-reduction reaction.

The resistance change layer is made of material containing a metal oxide, as described above, and is made of, for example, material containing an oxygen-deficient metal oxide. The metal oxide may be at least one selected from the group consisting of a transition metal oxide and an aluminum oxide. The metal oxide may also be at least one selected from the group consisting of a tantalum oxide, a hafnium oxide, and a zirconium oxide.

For driving the resistance variable element 313, a voltage that is generated based on an external power source and that satisfies a predetermined condition is applied between the first electrode layer 316 and the second electrode layer 314. The resistance value of the variable resistance layer 315 in the resistance variable element 313 increases or decreases reversibly in accordance with the direction (polarity) of the applied voltage and can transition to at least two or more states including a high-resistance state (HR state) in which the resistance value is high and a low-resistance state (LR state) in which the resistance value is lower than that in the HR state. Even after the voltage application is stopped, the resistance state is maintained, and the resistance value can be used to record information in accordance with each state. Examples of the material of the first electrode layer 316 and the second electrode layer 314 include platinum (Pt), iridium (Ir), tungsten (W), copper (Cu), aluminum (Al), titanium nitride (TiN), tantalum nitride (TaN), and titanium aluminum nitride (TiAlN).

The dotted line area in FIG. 1(a) represents one memory cell. FIG. 1(b) illustrates a circuit diagram representation of the memory cell. As illustrated in FIG. 1(b), one end of the resistance variable element and a drain terminal of the transistor, which is a selection element, are connected to each other. In the following description of overall constituent elements of a nonvolatile memory, each memory cell is assumed to have the circuit configuration illustrated in FIG. 1(b).

Figure 2:
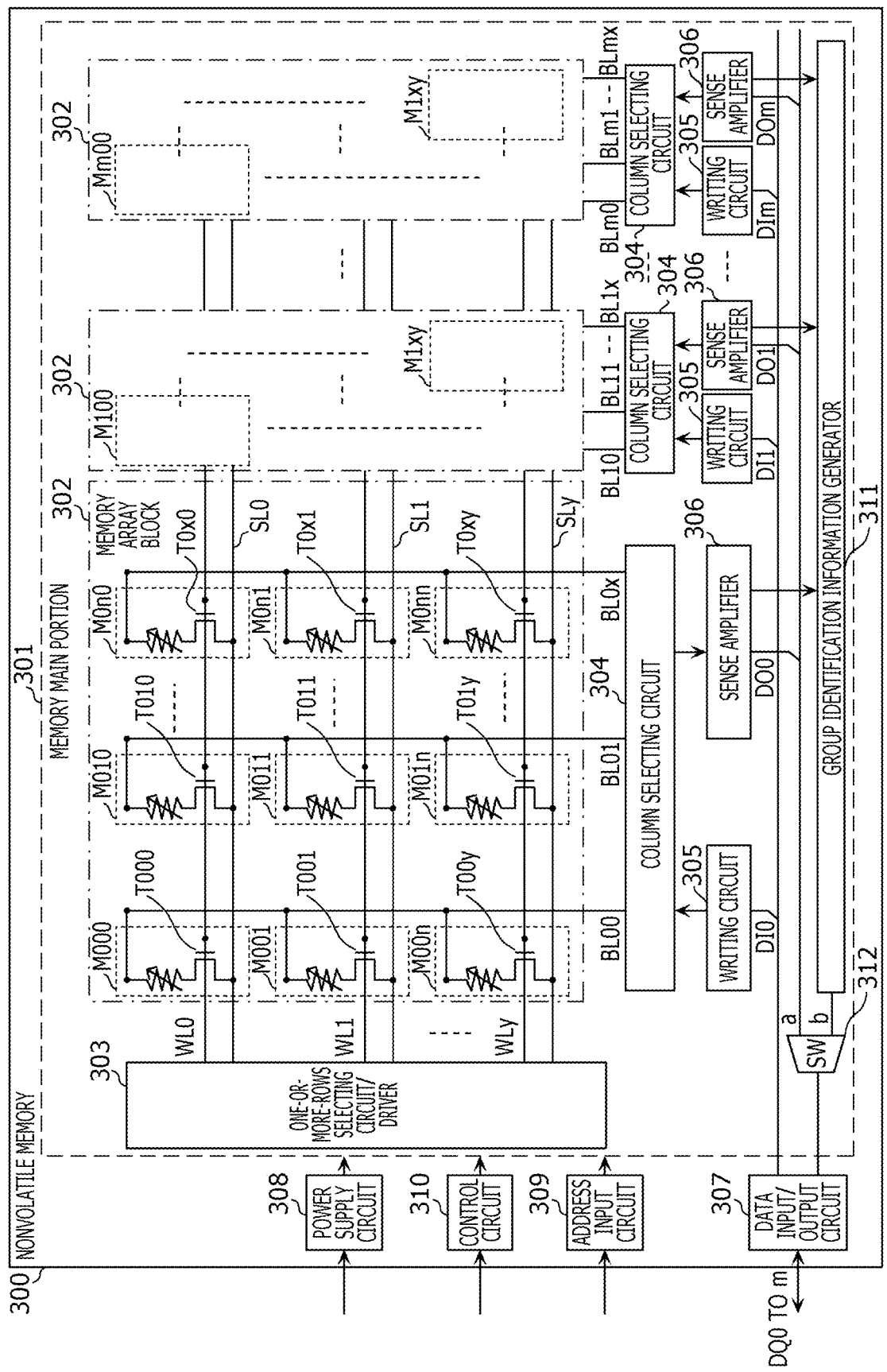
FIG. 2 is a block diagram illustrating one configuration of a nonvolatile memory in the embodiment.

Next, a description will be given of one example of a nonvolatile memory using resistance variable elements in the present disclosure. FIG. 2 is a block diagram illustrating one configuration of a nonvolatile memory 300 according to the present disclosure. As illustrated in FIG. 2, the nonvolatile memory 300 according to the present embodiment is one example of a semiconductor device (which may hereinafter be referred to simply as a "device") and has a memory main portion 301 on a semiconductor substrate. The memory main portion 301 includes memory array blocks 302, a one-or-more-rows selecting circuit/driver 303, column selecting circuits 304, writing circuits 305 for writing information, sense amplifiers (hereinafter also referred to as "reading circuits") 306, a data input/output circuit 307, a group identification information generator 311, and a switch circuit 312.

Each sense amplifier 306 detects the amount of current flowing through a memory cell selected via a selected bit line and determines whether information stored in the selected memory cell is data "1" or data "0". The data input/output circuit 307 performs input/output processing on input/output data via a terminal DQ. The group identification information generator 311 computes group identification information in the present disclosure in accordance with a plurality of pieces of resistance-value information obtained from each sense amplifier 306 and outputs the group identification information. The switch circuit 312 switches between an output of the sense amplifier 306 and an output of the group identification information generator 311 to input the resulting output to the data input/output circuit 307. The nonvolatile memory 300 further includes a power supply circuit 308 that uses external power to generate various types of power used in the nonvolatile memory 300, an address input circuit 309 that receives an address signal that is externally input, and a control circuit 310 that controls the operation of the memory main portion 301 on the basis of a control signal that is externally input.

Each of the memory array blocks 302 includes memory cells M000, M001, . . . , and M0xy (hereinafter referred to as "memory cells M000, M001, . . . ") formed on the semiconductor substrate. Each of the memory cells M000, M001, . . . includes one transistor and one resistance variable element connected in series with the transistor. That is, a plurality of transistors T000, T001, . . . , and T0xy (hereinafter referred to as "transistors T000, T001, . . . ") and a plurality of resistance variable elements constitute the memory cells M000, M001, . . . . Pairs of word lines WL0, WL1, . . . , and WLy and source lines SL0, SL1, . . . , and SLy, each pair consisting of one word line and one source line that are parallel to each other, are further arranged on the semiconductor substrate. Bit lines BL00, BL01, . . . , and BL0x are further arranged on the semiconductor substrate so as to intersect the pairs of word lines WL0, WL1, . . . , and WLy and source lines SL0, SL1, . . . , and SLy. The transistors T000, T001, . . . are provided to correspond to the areas at which the bit lines BL00, BL01, . . . , and BL0x intersect the pairs of word lines WL0, WL1, . . . , and WLy and source lines SL0, SL1, . . . , and SLy.

The circuit diagram representation of each memory cell complies with FIG. 1(b). In this case, each resistance variable element operates as a nonvolatile storage element in the memory cell. Since such a memory cell is constituted by one transistor and one resistance variable element, it is referred to as a "1T1R-type memory cell". The memory array blocks 302 are constituted by m memory array blocks 302, including an array block including a group of memory cells M000, M001, . . . , and M0xy, an array block including a group of memory cells M100, M101, . . . , and M1xy, and an array block including a group of memory cells Mm00, Mm01, . . . , and Mmxy. When the column selecting circuit 304 selects one bit line in each memory array block 302, and the one-or-more-rows selecting circuit/driver 303 selects one word line in the memory array block 302, one memory cell at which the selected bit line and the selected word line intersect each other is selected. That is, one memory cell is selected from each memory array block 302.

For storing general data in the nonvolatile memory 300 or reading data stored therein, the address input circuit 309 receives an address signal from an external circuit (not illustrated), and on the basis of the address signal, the address input circuit 309 outputs a row address signal to the one-or-more-rows selecting circuit/driver 303 and outputs a column address signal to the column selecting circuit 304. In this case, the address signal indicates an address in a specific memory cell to be selected from the memory cells included in the memory array blocks 302. The row address signal indicates a row address of addresses indicated by the address signal, and the column address signal indicates a column address of the addresses indicated by the address signal.

In an information writing cycle, in response to input data DI0 to DIm input to the data input/output circuit 307, the control circuit 310 outputs, to the respective writing circuits 305, writing signals for giving instructions for applying voltages for writing. On the other hand, in an information reading cycle, the control circuit 310 outputs, to the column selecting circuits 304 and the sense amplifiers 306, reading signals for giving instructions for applying voltages for reading. The sense amplifiers 306 restores data to original data 0 or 1 in accordance with the resistance value of a selected memory cell and sends resulting data DO0 to DOm to the data input/output circuit 307 via the switch circuit 312. At this point in time, an output of the switch circuit 312 is connected to an input a in accordance with an instruction from the control circuit 310.

Upon receiving the writing signal output from the control circuit 310, each writing circuit 305 outputs, to the corresponding column selecting circuit 304, a signal for giving an instruction for applying a voltage for writing to a selected bit line of the bit lines. Also, in an information reading cycle, the sense amplifiers 306 detects the amount of current flowing through the selected bit line, which is a line through which information is to be read, and determines whether the information is data "1" or data "0". Output data DO resulting from the determination is output to an external circuit via the data input/output circuit 307.

The above-described operation is an operation in a typical function for storing data in the nonvolatile memory 300 or reading data stored therein. Next, a description will be given of a function for generating group identification information.

First, a description will be given of an underlying concept of generating group identification information. When two appliances attempt to authenticate each other, they need to mutually confirm that the opposing appliance is a specific partner, by exchanging a secret rule and information that are known only thereby. When a cryptographic circuit is used as a related technology, key data used for cryptography serves as secret information, and there is a problem in that the key data is compromised. In addition, in known PUFs, unique individual identification information that differs from one apparatus to another and that cannot be duplicated is used as secret information, and initial registration with a third-party organization is needed in order to certify that the individual identification information is authentic information, and a query is needed every time authentication is performed. This makes the known PUFs unsuitable for authentication between local appliances that cannot easily connect to a network.

As a countermeasure against this problem, the present inventor has invented performing mutual authentication by comparing aggregate characteristics against each other, the aggregate characteristics being obtained by combining features of physical characteristics of devices manufactured in a specific manufacturing process owned by a specific manufacturer. The combination of the features may be an arbitrary combination. The comparison of the aggregate characteristics can be performed by comparing group identification information against each other, the information being generated based on aggregate characteristics. This allows secret information to be exchanged based on a secret rule that apparatuses having devices created in the same process (i.e., devices belong to the same group) perform mutual authentication. The secret information in this case is, in essence, know-how of a manufacturing process. In the present embodiment, a "device belonging to the same group as another device manufactured in the same process" means that a device, for example, a nonvolatile memory (more specifically, resistance variable elements) or the like, is manufactured using the same material and structure as those of another nonvolatile memory or the like.

Figure 3A:
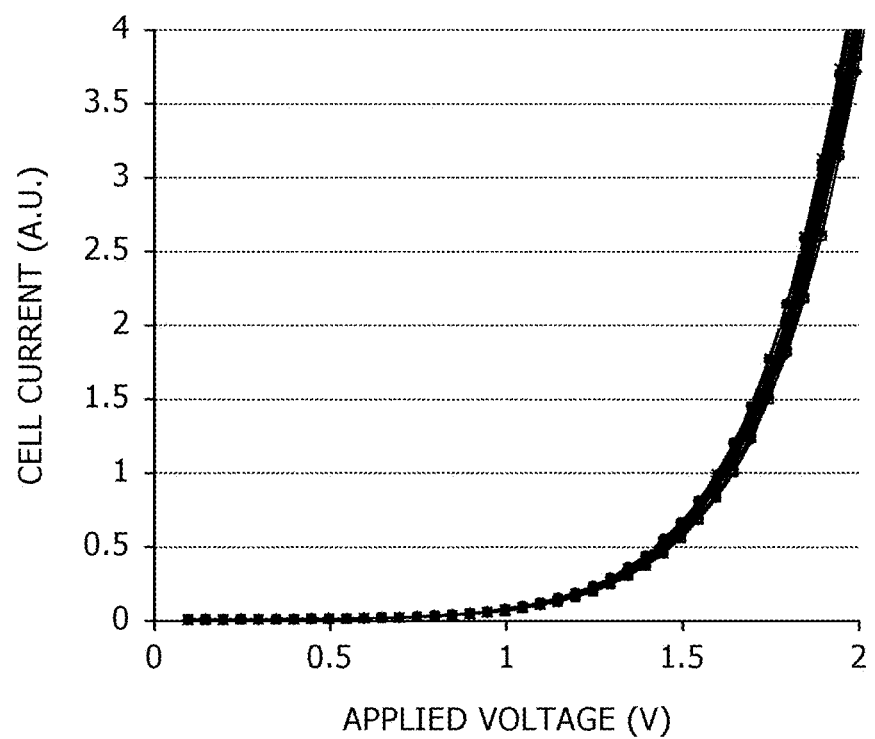
FIG. 3A is a graph illustrating a resistance characteristic in an initial state of a resistance variable element.
Figure 3B:
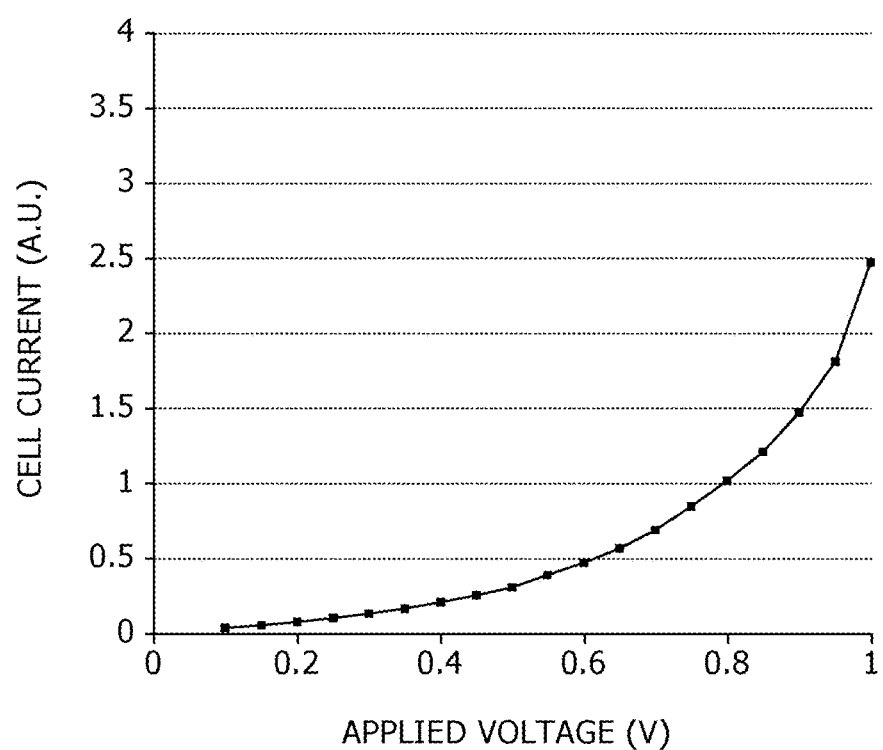
FIG. 3B is a graph illustrating a resistance characteristic in a high-resistance state of the resistance variable element.
Figure 3C:
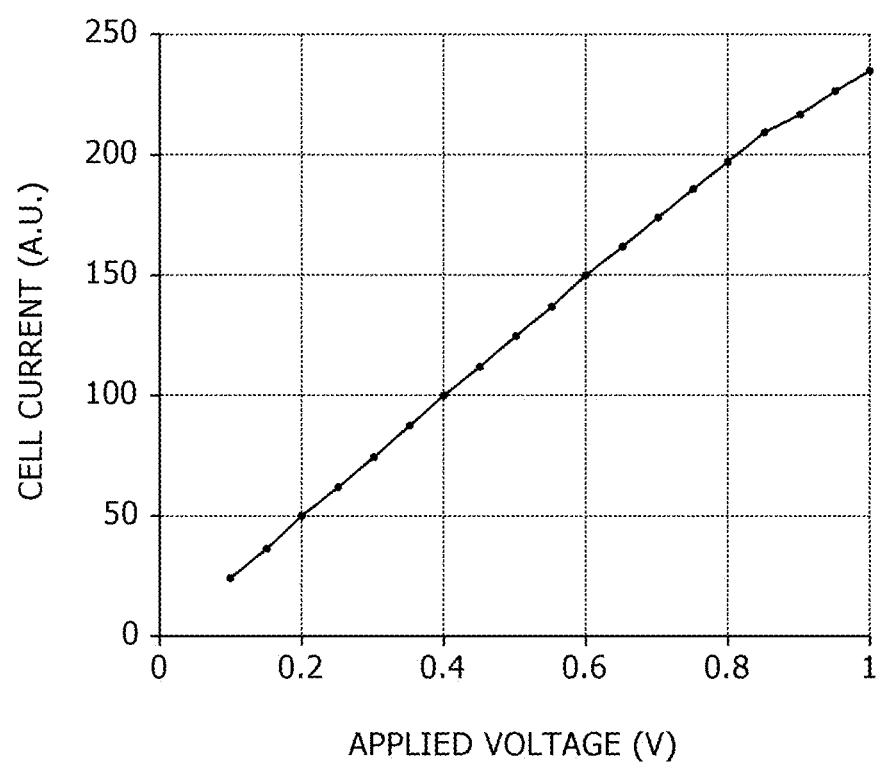
FIG. 3C is a graph illustrating a resistance characteristic in a low-resistance state of the resistance variable element.

In the case of the resistance variable elements, the physical characteristics used for the exchange are resistance characteristics. FIGS. 3A, 3B, and 3C illustrate resistance characteristics (I-V characteristics) in respective states of the resistance variable elements. The resistance characteristic of each resistance variable element is represented by the value of cell current that flows upon application of each voltage, and is generally indicated as a current-voltage characteristic (I-V characteristic). FIG. 3A illustrates a resistance characteristic in an initial state, FIG. 3B illustrates a resistance characteristic in an HR state, and FIG. 3C illustrates a resistance characteristic in an LR state.

Each resistance variable element has three states, that is, the initial state, the HR state, and the LR state. The initial state is a state in which the resistance value of the resistance variable element has a predetermined resistance-value range that is significantly higher as the resistance variable element is in a more-insulation state. The HR state is a high-resistance state in which the resistance value of the resistance variable element is smaller than that in the initial state and has a predetermined resistance-value range. The LR state is a low-resistance state in which the resistance value of the resistance variable element is smaller than that in the high-resistance state and has a predetermined resistance-value range. Immediately after the resistance variable elements 313 are manufactured, the second oxide layers 315a illustrated in FIG. 1(a) are in the insulation state. When electrical stress (e.g., a pulse voltage) greater than or equal to a predetermined value, the stress being called "forming stress", is applied across two opposite ends of each resistance variable element 313, a filament (i.e., a conduction path that penetrates the resistance change layer) is generated in the oxide layer, and the resistance variable element 313 is put into a variable state (i.e., a variable resistance state). The conduction path can be said to be a portion having an oxygen-deficient metal oxide in which an oxygen content is lower than that in the resistance change layer.

The resistance variable element 313 put into the variable state can transition between the HR state and the LR state, in accordance with the voltage applied across two opposite ends of the resistance variable element 313 and the polarity thereof (i.e., the application direction of the applied voltage). The resistance variable element 313 put into the variable state maintains its state at a voltage lower than or equal to a predetermined voltage for reading. As described above, information is stored using the HR state and the LR state. It can also be understood from FIGS. 3A, 3B, and 3C that the LR state has a linear characteristic and the HR state and the initial state have a nonlinear characteristic. The nonlinear characteristic depends on the material of the resistance variable element and conditions in the manufacturing process. Since the resistance characteristic varies depending on complex parameters, such as a film thickness of an oxide layer, the amount of oxidation, and a cell diameter, only a limited manufacturer that knows the know-how of the manufacture can manufacture devices having an identical resistance characteristic.

Figure 4:
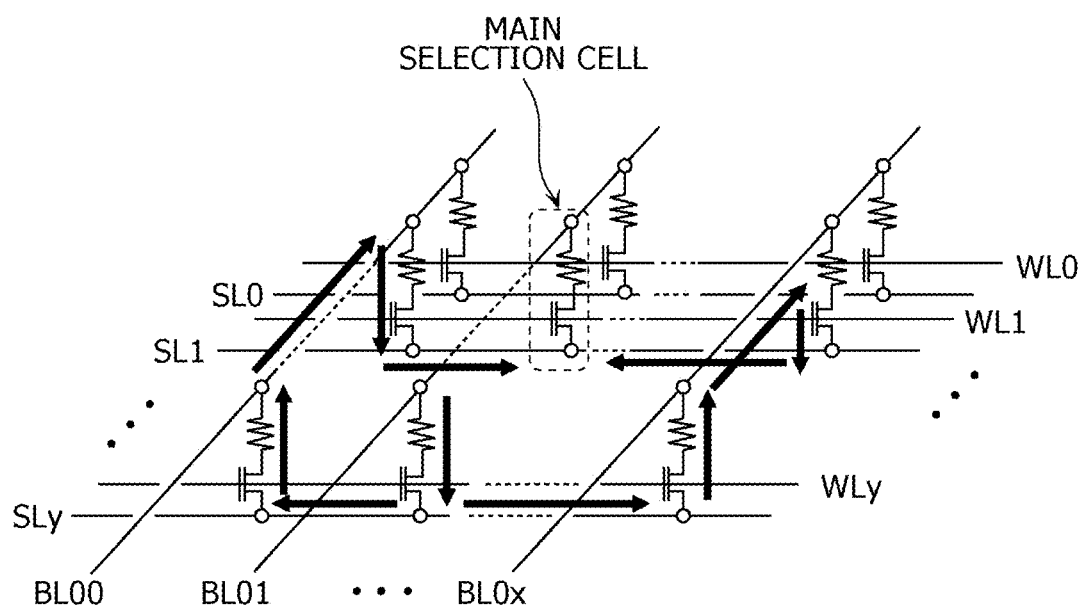
FIG. 4 is a schematic diagram depicting one memory array block in a three-dimensional manner.

A description will be given of a scheme for generating group identification information by using a nonlinear resistance characteristic as described above. FIG. 4 is a schematic diagram depicting one memory array block 302 in a three-dimensional manner. In the memory array block 302 depicted in FIG. 4, the bit lines BL00 to BL0$x$, the source lines SL0 to SL$y$, and the word lines WL0 to WL$y$ are provided, the bit lines BL00 to BL0$x$ intersect the source lines SL0 to SL$y$ and the word lines WL0 to WL$y$, and memory cells are arranged at the respective intersections at which they intersect. During access to a typical nonvolatile memory, one memory cell in one memory array block is selected, as described above. However, during generation of group identification information, sub selection cells are selected in addition to a main selection cell.

A voltage Vwm for a selected word line is applied to the word line (WL1 in FIG. 4) that is included in the word lines WL0 to WL$y$ and with which the main selection cell is associated. A voltage Vws, which is lower than the voltage Vwm, is applied to the other word lines (in FIG. 4, the word lines other than WL1) with which the sub selection cells are associated. In addition, at this point in time, the column selecting circuit 304 selects the bit line BL01 and connects the bit line BL01 to the corresponding sense amplifier 306. The transistor in which the voltage Vwm is applied to a gate terminal thereof enters a sufficiently ON state and can pass a largest current indicated by the capability of the transistor.

However, each transistor in which the voltage Vws, which is lower than the voltage Vwm, is applied to the gate terminal operates in the non-saturation region of the transistor, and operates in a state in which the on-resistance of the transistor is equivalently high, so that the amount of current is limited to the amount of current that is lower than that in the transistor in the main selection cell. For simplicity of description, the above description has been given of an example in which the voltage Vwm is applied to one word line in one memory array block 302 and the voltage Vws is applied to all of the other word lines therein. However, for example, as long as the number of word lines to which the voltage Vws is applied is at least one, the operation in the present disclosure is possible. As the number of sub selection cells increases, the routes of sub current paths, which are described below, become complicated to thereby enhance the security.

Figure 5:
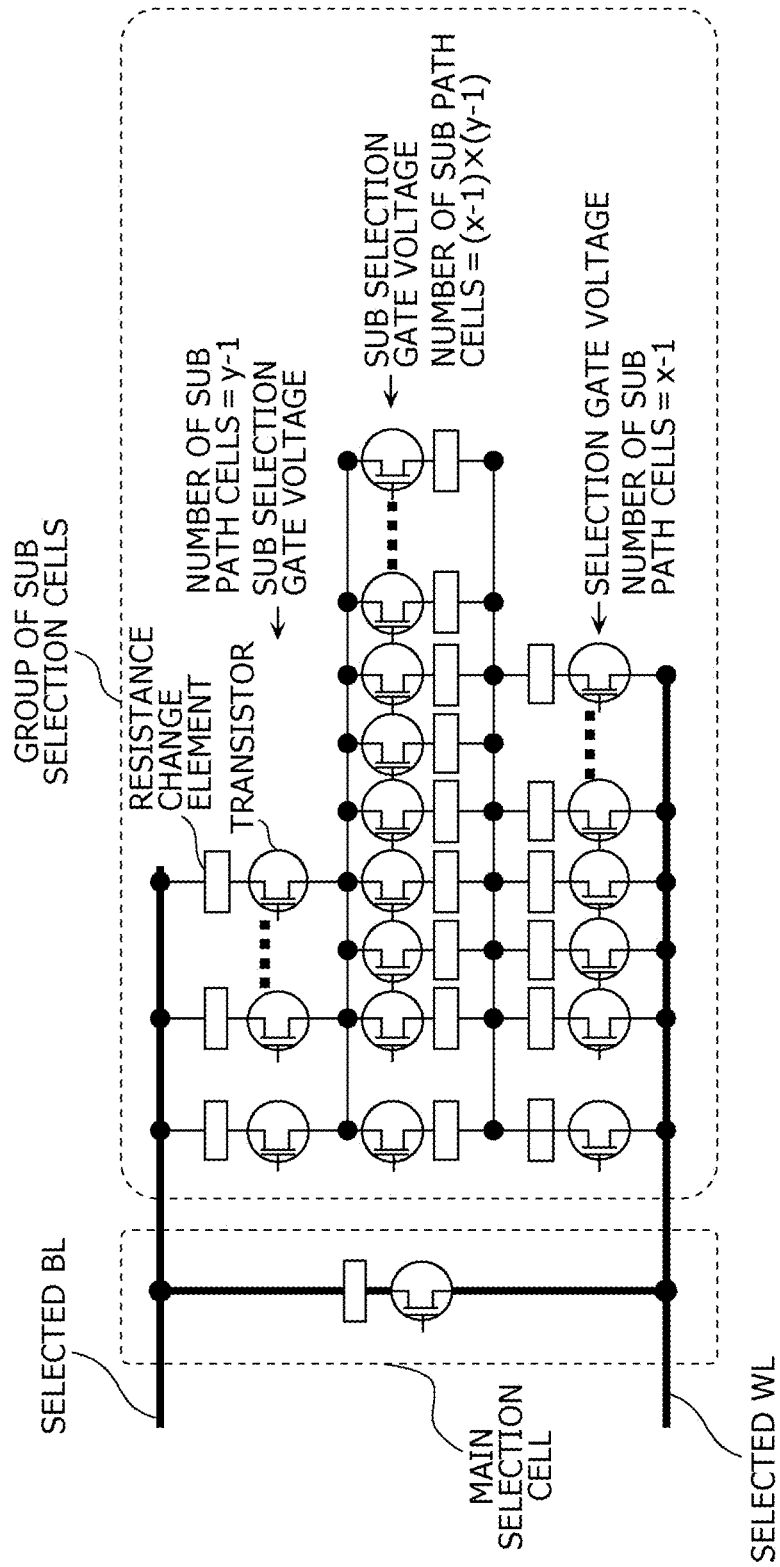
FIG. 5 is an equivalent circuit diagram illustrating current paths of a group of sub selection cells in the memory array block illustrated in FIG. 4.

According to a method for selecting any of memory cells including both a main selection cell and sub selection cells, as described above, sub current paths as depicted by thick arrows in FIG. 4 occur. That is, sub current paths that flow through three memory cells occur in addition to current path that flows through the main selection cell. FIG. 5 is an equivalent circuit illustrating current paths in the group of sub selection cells. In the equivalent circuit illustrated in FIG. 5, the group of sub selection cells is constituted by sub selected memory cells at three stages. That is, (y−1) memory cells are coupled in parallel at an upper stage, (x−1)×(y−1) memory cells are coupled in parallel at a middle stage, and (x−1) memory cells are coupled in parallel at a lower stage. The number of memory cells differs depending on the number of word lines to which the voltage Vws, which is a sub selection voltage, is applied.

The equivalent circuit in FIG. 5 is an equivalent circuit for direct-current resistance (DC resistance). An impedance that is given as alternating-current resistance (AC resistance) is also relevant to a wire capacitance, a wiring resistance, and a transistor diffusion capacitance and thus exhibits very complex characteristics. Also, the nonlinear resistance characteristic of the resistance variable elements, as described above, is further added to the characteristics, thereby exhibiting a combined resistance that cannot be represented by a simple model equation. Such a combined resistance of the resistance variable elements is an aggregate characteristic of physical characteristics specific to devices used in the present disclosure. The aggregate characteristic of physical characteristics cannot be represented by a simple model equation. However, when apparatuses that authenticate each other have a configuration in which devices having the same physical characteristics are constituted by the same constituent elements, it is possible to easily measure the same aggregate characteristic of physical characteristics. In addition, when the apparatuses compare results of the measurements against each other, it is possible to perform authentication excluding other apparatuses that do not have the devices having the same physical characteristics.

Next, a description will be given of the reading circuit that measures a combined resistance of a group of memory cells, the combined resistance being an aggregate characteristic of physical characteristics, and the group identification information generator.

(Details of Reading Circuit for Combined Resistance)

Figure 6:
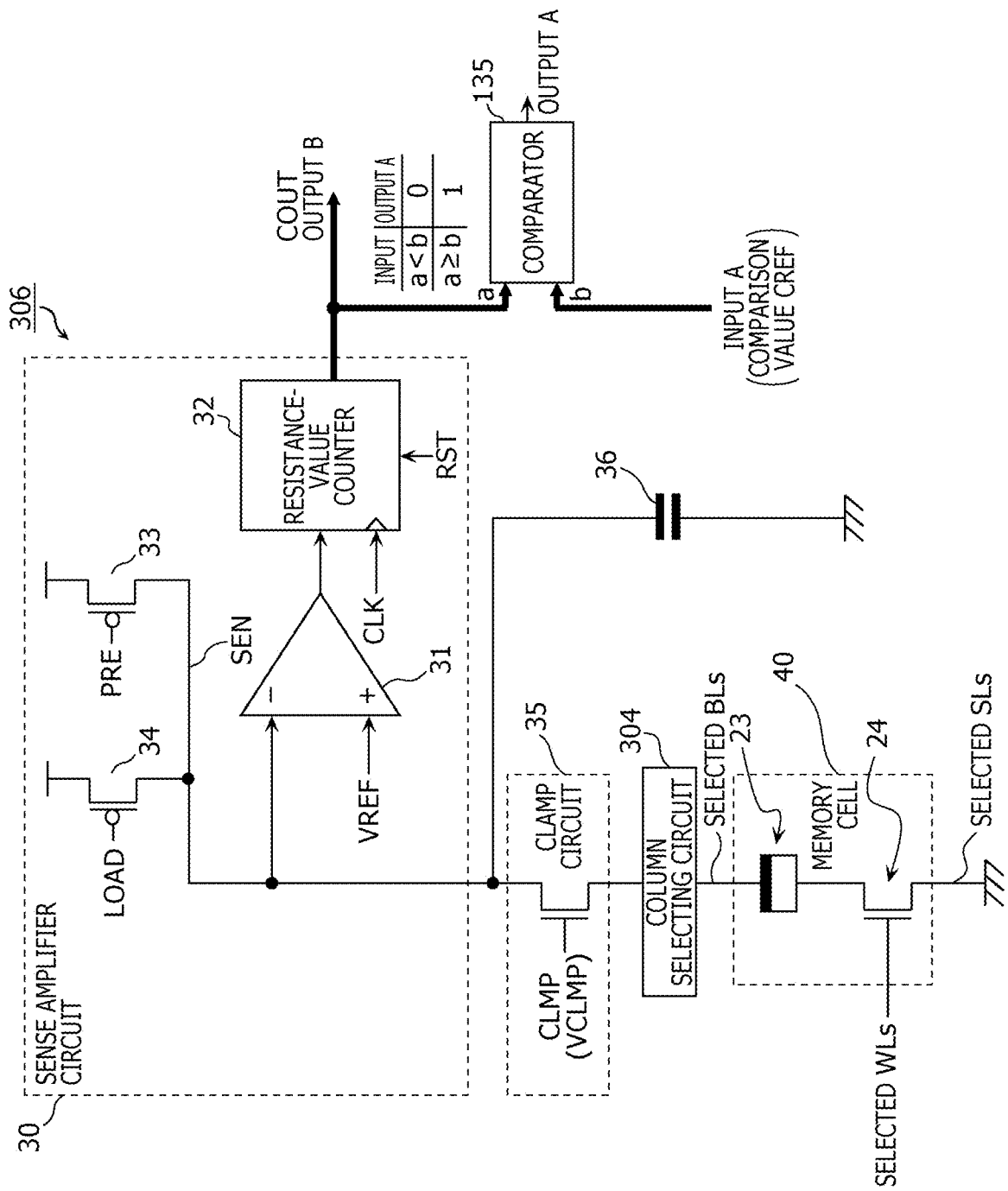
FIG. 6 is a circuit diagram illustrating an example of the configuration of a reading circuit included in the nonvolatile memory.

FIG. 6 is a circuit diagram illustrating an example of the configuration of the reading circuit (sense amplifier) 306 included in the nonvolatile memory 300 in the present disclosure. The reading circuit 306 is one example of an aggregate-characteristic detector that detects, when physical characteristics of a plurality of elements are set in accordance with combination information (e.g., random-number data), an aggregate characteristic (e.g., a combined resistance) obtained by combining the set physical characteristics of the elements. The reading circuit 306 has a sense amplifier circuit 30 using a discharge scheme. The sense amplifier circuit 30 includes a comparator 31, a resistance-value counter 32, a P-channel metal-oxide semiconductor (PMOS) transistor 33 for precharging, and a PMOS transistor 34 for load current. The sense amplifier circuit 30 further includes a clamp circuit 35, which includes an N-channel metal-oxide semiconductor (NMOS) transistor for clamp voltage application.

The resistance-value counter 32 is connected to an output of the comparator 31. When the level of a reset signal RST becomes low, a count value in the resistance-value counter 32 is initialized. After the initialization, the resistance-value counter 32 starts counting according to a clock signal CLK. The resistance-value counter 32 converts a discharge time, which varies according to the resistance value of a selected memory cell that is coupled to a selected bit line connected via the column selecting circuit 304 under the control of the control circuit 310, into a count value. The clock signal CLK is a signal used for a count cycle during the conversion and is output from the control circuit 310.

The clock signal CLK is, for example, a rectangular wave that maintains a certain frequency. Each time the clock signal CLK rises, the count value of the resistance-value counter 32 is incremented by 1, and when a potential at a node SEN falls below a reference voltage VREF, the incrementation of the resistance-value counter 32 stops, and the count value at this point in time is maintained at a resistance-value counter output terminal COUT and is output as an output B. At this point in time, a threshold CREF is input from an input A. A comparator 135 compares the count value from the resistance-value counter output terminal COUT with the threshold CREF. When the count value is larger than or equal to the threshold CREF, 1 is output, and when the count value is smaller than the threshold CREF, 0 is output from the output A. Although not illustrated in FIG. 2, the input A is a setting value input from the control circuit 310.

The binary data 0 or 1 output from the output A is generally used when data stored in the nonvolatile memory 300 is restored to its original digital data. The PMOS transistor 33 for precharging has a gate terminal to which a precharge control signal PRE is input, a source terminal to which VDD is input, and a drain terminal to which the node SEN is connected. The PMOS transistor 34 for load current has a gate terminal to which a load control signal LOAD is input, a source terminal to which VDD is input, and a drain terminal to which the node SEN is connected.

A clamp control signal CLMP is input to a gate terminal of the clamp circuit 35, which includes an NMOS transistor, the node SEN is connected to one of a source terminal and a drain terminal of the clamp circuit 35, and a memory cell 40 selected via the column selecting circuit 304 is connected to the other of the source terminal and the drain terminal. The memory cell 40 is a memory cell selected from the memory cells in one memory array block 302. When the combined resistance of the memory cells in the present disclosure is to be measured, the resistances of a group of sub selection cells is added to the resistance of a main selection cell as in FIG. 5.

Figure 7:
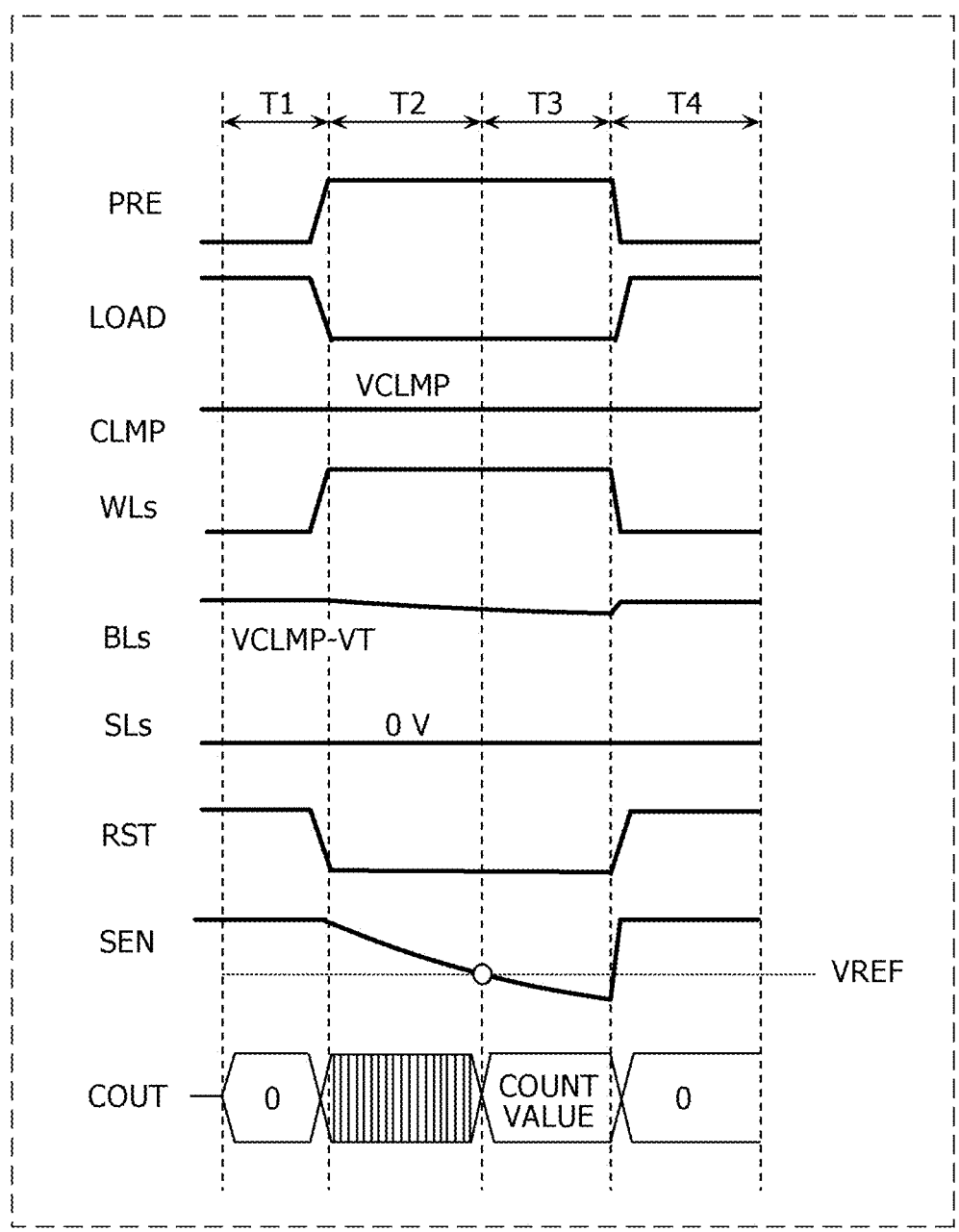
FIG. 7 is a timing chart illustrating an operation of the reading circuit.

Now, an operation in which the reading circuit 306 outputs a count value (one example of a resistance count value) will be described in detail with reference to a timing chart in FIG. 7. FIG. 7 is a timing chart for a case in which reading from a selected memory cell is performed using a discharge scheme. In a precharge period T1, the level of the control signal PRE becomes low, and the PMOS transistor 33 for precharging enters an ON state. The level of the control signal LOAD becomes high, and the PMOS transistor 34 for load current enters an OFF state. The potential of the selected word line WL is at a low level, and an NMOS transistor 24 is in an OFF state.

When a voltage VCLMP is applied to the gate terminal of the NMOS transistor included in the clamp circuit 35, the potential of a selected bit line BLs is precharged to a potential obtained by subtracting VT (a threshold for the NMOS transistor included in the clamp circuit 35) from VCLMP. A selected source line SLs is fixed to GND. The node SEN is precharged to VDD. Also, since the reset signal RST for the resistance-value counter 32 connected to the output of the comparator 31 is at a high level, a fixed value "0" is output from the resistance-value counter output terminal COUT.

In a sense period T2, the control signal PRE is set to a high level, so that the PMOS transistor 33 for precharging is put into an OFF state. When the level of the control signal LOAD becomes low, the PMOS transistor 34 for load current enters an ON state. Also, when the potential of a selected word line WLs is set to a high level, the NMOS transistor 24 is put into an ON state.

A voltage is applied to the selected source line SLs from a selected bit line BLs via the selected memory cell 40, and discharging is started. Simultaneously with the start of the discharging, the level of the reset signal RST for the resistance-value counter 32 becomes low to start the counting. Then, for each count, the comparator 31 compares the potential at the node SEN with the reference voltage VREF, and the count value is continuously incremented until the potential at the node SEN falls below the reference voltage VREF. The larger the resistance value of a resistance variable element 23 during reading is, the longer the discharge time becomes, and the larger the count value becomes.

Also, by adjusting the capacitance of a capacitor 36, it is possible to adjust the discharge time. When the capacitance of the capacitor 36 increases, the discharge time of the node SEN also increases, and thus the count value increases. Conversely, when the capacitance of the capacitor 36 decreases, the discharge time of the node SEN decreases, and the count value decreases. The capacitor 36 is effective, for example, when it is desirable to enhance the accuracy of detecting a low resistance level at which the discharge time is short. The interval of the counting is determined by the clock signal CLK. Hence, the frequency of the clock signal CLK is the resolution of the resistance count value.

When the resistance value is small, the discharge time becomes too short, which may make it impossible to appropriately detect the resistance value with the resolution of the count value (i.e., which may make it impossible to distinguish the detected resistance value). Accordingly, a capacitive load is additionally applied to the node SEN to delay the discharging, thereby making it possible to adjust the discharge characteristics of a level at which the detection can be performed with a desired resolution. In the discharge scheme, in principle, when the resistance increases, the discharge time increases, and correspondingly, the gradient of discharging changes gradually, thus enhancing the resolution of resistance-value information for the count value. That is, the discharge scheme is a scheme in which resistance-value information with higher accuracy can be obtained for a higher resistance.

In a latch period T3, after the discharging is started, the count value of the resistance-value counter 32 when the potential at the node SEN falls below the reference voltage VREF is latched. The latched count value (i.e., the count value in the latch period T3) is output to the resistance-value counter output terminal COUT (output B), is received by another block, and is treated as detailed resistance-value information of the selected memory cell.

In a reset period T4, when the data outputting is completed, the potential of the selected word line WLs is set to the low level, the NMOS transistor 24 in the selected memory cell 40 is turned off, the reading operation is finished, and the operation enters an idle state for next reading. In addition to a scheme for measuring the discharge time, as described in this example, a method for measuring the charge time of a voltage across two opposite ends of a memory cell by using the configuration requirements in FIG. 6 is also available. However, since such a method concerns design issues, a description thereof is not given herein. That is, any means that measures the resistance value of a measurement target by using a resolution having three or more values is also encompassed by the configuration requirements in the present disclosure.

(Details of Group Identification Information Generator)

Figure 8:
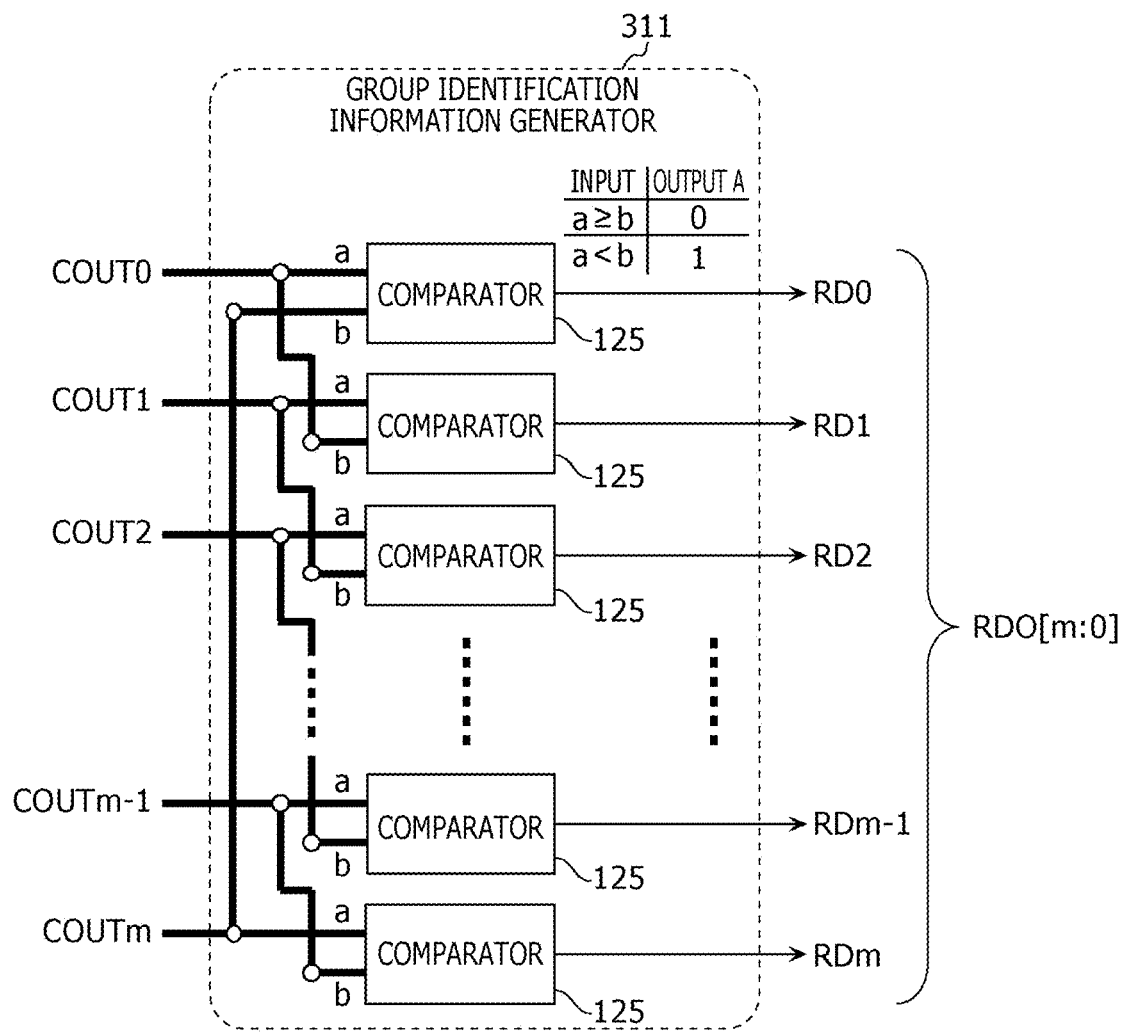
FIG. 8 is a circuit diagram illustrating one specific example of a group identification information generator.

FIG. 8 is a circuit diagram illustrating one specific example of the group identification information generator 311 in the present disclosure. The group identification information generator 311 is one example of a group identification information generator that generates, based on aggregate characteristics (e.g., combined resistances) detected by the aggregate-characteristic detectors (e.g., the sense amplifiers 306), group identification information for identifying a device (e.g., the nonvolatile memory 300) as belonging to the same group as another device manufactured in the same process.

The outputs B of the resistance-value counter output terminals COUT of the sense amplifiers 306, which are responsible for the corresponding memory array blocks 302, are input to the group identification information generator 311. In FIG. 2, detection values output from the sense amplifiers 306, the detection values being based on combined resistances obtained from the corresponding memory array blocks 302, are respectively denoted by COUT0, COUT1, . . . , COUTm−1, and COUTm. The detection values are input to COUT0 to COUTm illustrated in FIG. 8. As in the comparator 31 described above with reference to FIG. 6, each comparator 125 in FIG. 8 compares the value of input a with the value of input b, then outputs 0 for a≥b, and outputs 1 for a<b. That is, the group identification information generator 311 compares combined resistances of adjacent channels and performs conversion into a binary digital value "0" or "1". Digital data of (m+1) bits of RDO[m:0] is output from the group identification information generator 311.

Now, a description will be given of a definition of the group identification information. With reference to FIG. 5, information that is a basis for the group identification information has been described above as being, in the present embodiment, the combined resistance of memory cells included in a nonvolatile resistive memory. This will be described with reference to FIG. 9.

Figure 9:
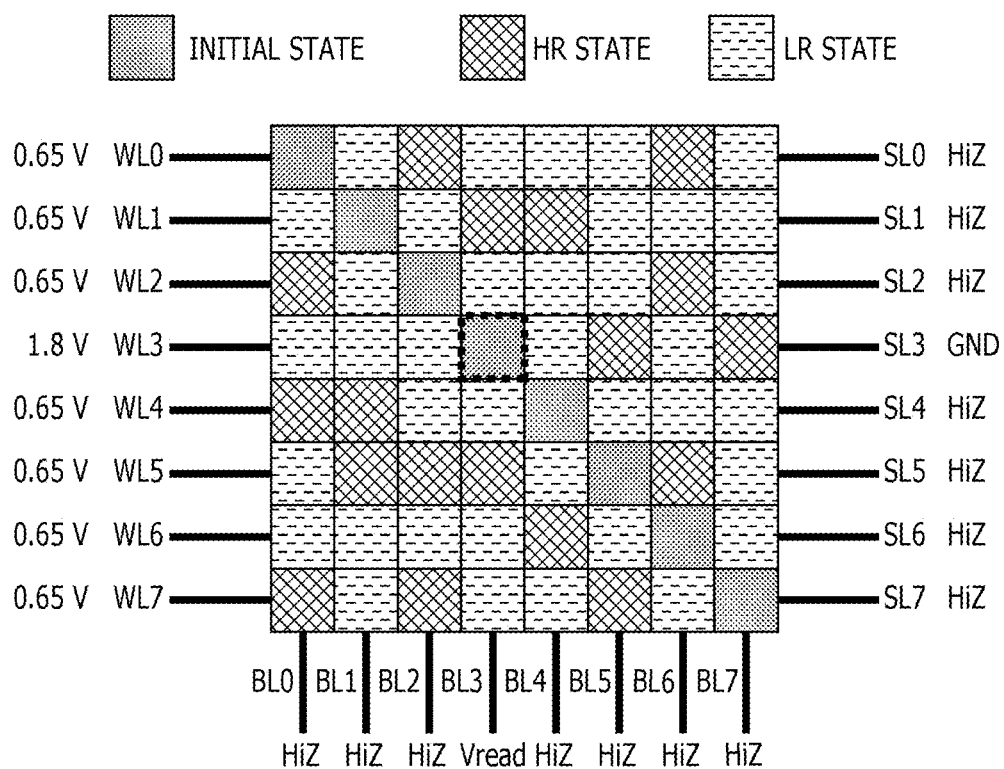
FIG. 9 is a schematic diagram illustrating one memory array block in FIG. 2 as an 8×8 memory array.

FIG. 9 is a schematic diagram illustrating one memory array block 302 in FIG. 2 as an 8×8 memory array for x=7 and y=7. In FIG. 9, each cell (quadrangle) represents one memory cell. Each memory cell having a dark gray pattern indicates an initial state, each memory cell having a lattice pattern indicates the HR state, and each memory cell having a dashed-line pattern indicates the LR state. The memory cells in the initial state exist on a diagonal line in the 8×8 memory array, and the other memory cells are randomly set in the HR state and the LR state. The resistance characteristics in the initial state, the HR state, and the LR state are the same as those illustrated in FIG. 3A, FIG. 3B, and FIG. 3C.

In FIG. 9, a bit line BL3 is connected to the sense amplifier 306, and a voltage Vread, which is lower than the voltage VCLMP by an amount corresponding to the threshold voltage of the transistor, is applied to the bit line BL3. Other bit lines BL0 to BL2 and BL4 to BL7 are set to have high impedances (HiZ). A source line SL3 is set to have a ground level (GND), and other source lines SL0 to SL2 and SL4 to SL7 are set to have high impedances (HiZ). In addition, 1.8 V corresponding to the voltage Vwm is applied to a word line WL3, and 0.65 V corresponding to the voltage Vws is applied to other word lines WL0 to WL2 and WL4 to WL7. That is, the memory cell surrounded by a dotted line in FIG. 9 is a main selection cell, and the other memory cells are sub selection cells. The reason why the main selection cell is a memory cell in the initial state is to enhance the sensitivity of detecting current flowing in sub conduction paths. That is, the reason is to detect the combined resistance of a group of sub selected memory cells with higher sensitivity. The selection state for the combined resistance as described above is defined as Rsel(3, 3).

In FIG. 9, a total of eight memory cells in the initial state are provided on the diagonal line of the array. The selection states of the eight memory cells are represented by eight states, that is, Rsel(0, 0), Rsel(1, 1), Rsel(2, 2), Rsel(3, 3), Rsel(4, 4), Rsel(5, 5), Rsel(6, 6), and Rsel(7, 7). The memory cells other than the memory cells in the initial state on the diagonal line are randomly put into the HR state and the LR state and designated as sub selection cells; without changing this single pattern, each of the memory cells on the diagonal line is sequentially switched and selected as a main selection cell; and combined resistances of the eight selection states are simulated. HSPICE, which is a circuit simulation tool, from Synopsys, Inc. is used in this simulation.

Figure 10:
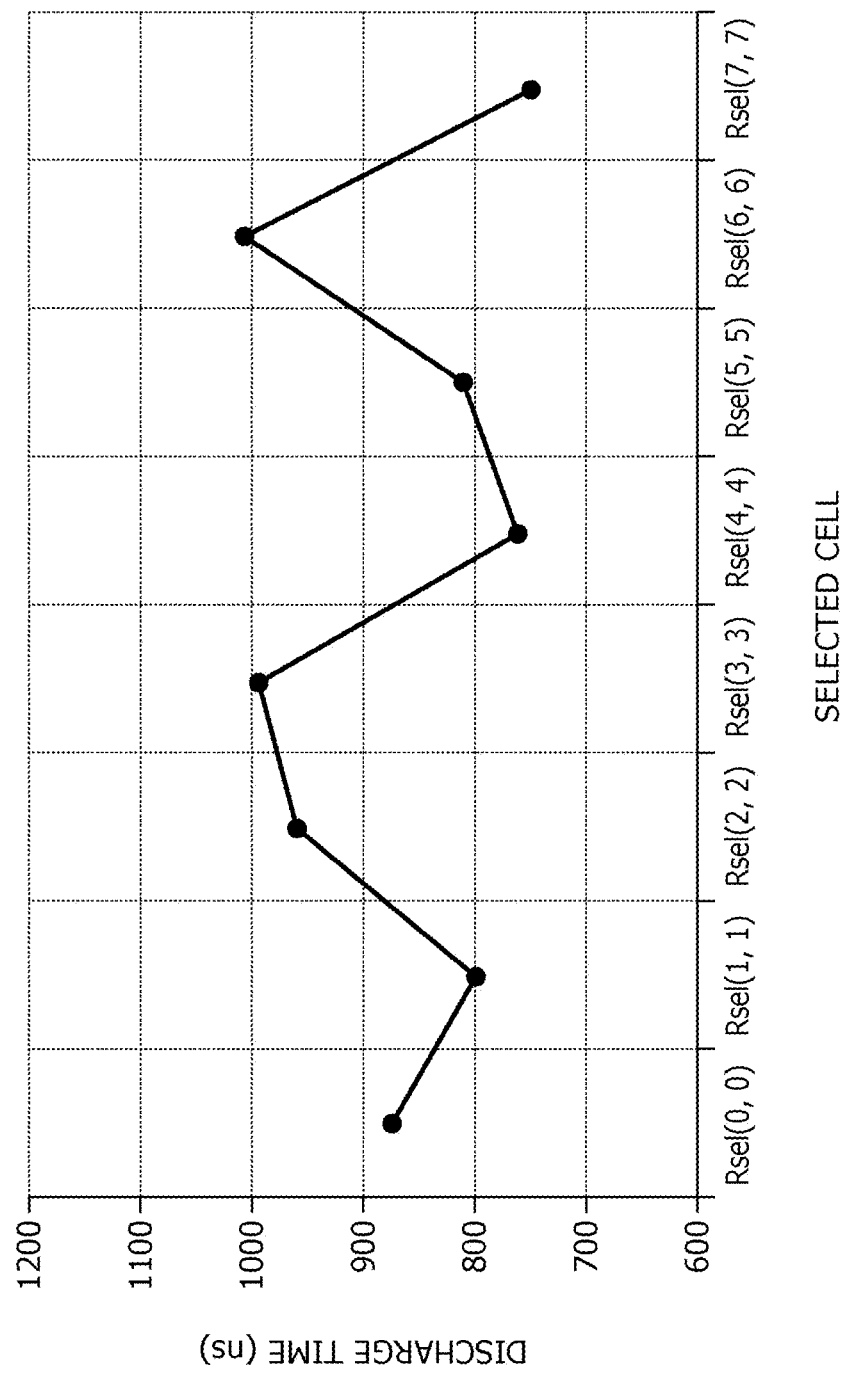
FIG. 10 is a graph illustrating a combined resistance obtained when memory cells other than memory cells on a diagonal line are randomly put into an HR state and an LR state, and without changing this single pattern, each of the memory cells on the diagonal line is designated as a main selection cell and the other memory cells are designated as sub selection cells.

FIG. 10 illustrates a result of the simulation. In FIG. 10, the selection states of Rsel(0, 0), Rsel(1, 1), . . . , and Rsel(7, 7) are plotted on the horizontal axis, and results of the above-described sense-amplifier discharge times in which the combined resistances in the respective selection states are measured is plotted on the vertical axis. The patterns of the resistance states of the memory cells other than the memory cells in the initial state on the diagonal line are the same, but when the main selection cell differs, the conduction pattern to the sub selection cells differs, and thus the combined resistance varies. Hence, as can be understood from FIG. 10, differences in the conduction pattern appear as differences in the discharge time.

Figure 11:
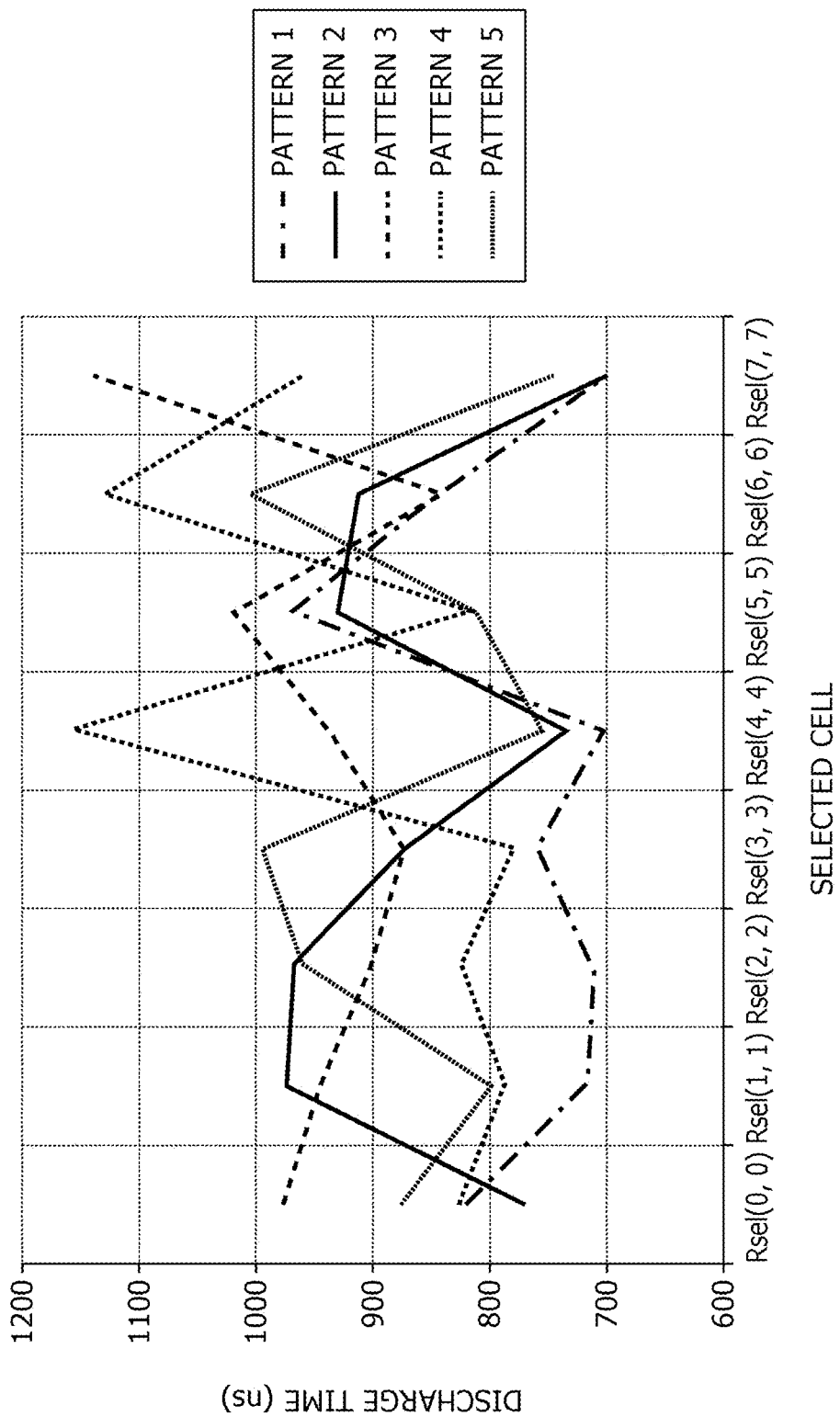
FIG. 11 is a graph illustrating changes in the combined resistance obtained when each memory cell on the diagonal line is designated as a main selection cell and the other memory cells are designated as sub selection cells in five types of pattern obtained by randomly changing a pattern of writing to the memory cells other than the memory cells on the diagonal line.

FIG. 11 illustrates a simulation result when a pattern of writing to the memory cells other than the memory cells in the initial state is randomly changed to five types of pattern, which are used as sub selection cells. These patterns are referred to as "patterns 1 to 5". FIG. 11 illustrates changes in the combined resistance when each memory cell on the diagonal line is sequentially switched and selected as the main selection cell in each pattern (i.e., FIG. 11 illustrates changes in the combined resistance in each arrangement). The pattern illustrated in FIG. 10 corresponds to pattern 5 in FIG. 11. As can be understood from FIG. 11, various increase/decrease states of the combined resistances are observed according to the writing patterns. Such increases/decreases in the combined resistance in each selection state are herein referred to as an "increase/decrease pattern of a combined resistance" (or a "transition of a combined resistance"). Information indicating such a writing pattern is combination information indicating an arbitrary combination of physical characteristics of a plurality of elements manufactured on a semiconductor substrate and included in a device.

Figure 13:
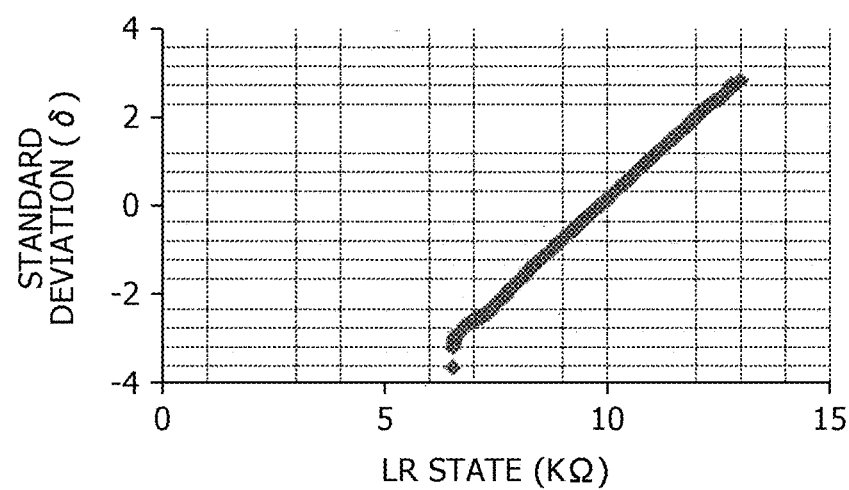
FIG. 13 is a graph illustrating a distribution of variations in a resistance value when a resistance variable element is in the LR state.
Figure 14:
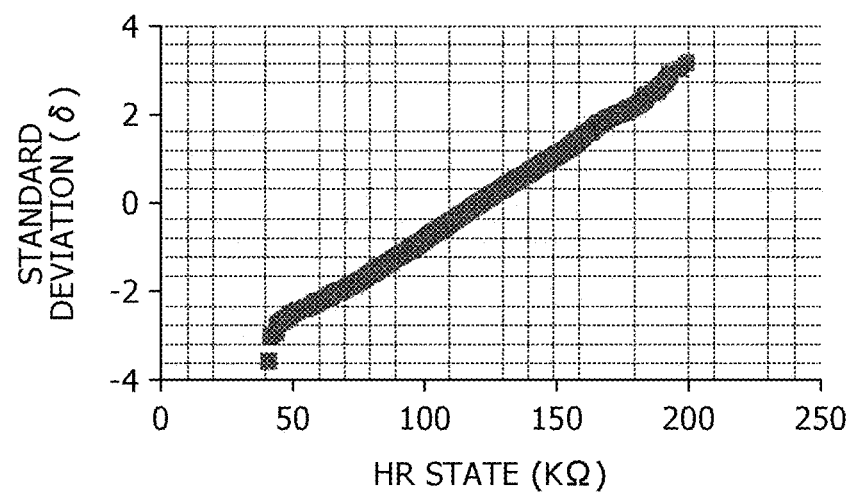
FIG. 14 is a graph illustrating a distribution of variations in a resistance value when the resistance variable element is in the HR state.

Next, a description will be given of reproducibility of the increase/decrease pattern of the combined resistance. Suppose a case in which the resistance values in the HR state and the LR state (these resistance values may hereinafter be referred to simply as an "HR state" and an "LR state") vary in a state in which the memory cells which provides the increase/decrease pattern illustrated in FIG. 10 are set. It has been known that, in the tantalum-oxide resistance variable elements exemplified hereinabove, distribution of variations in the HR state and the LR state conforms to a normal distribution. FIG. 13 illustrates distribution of variations in the LR state, FIG. 14 illustrates distribution of variations in the HR state.

Figure 12:
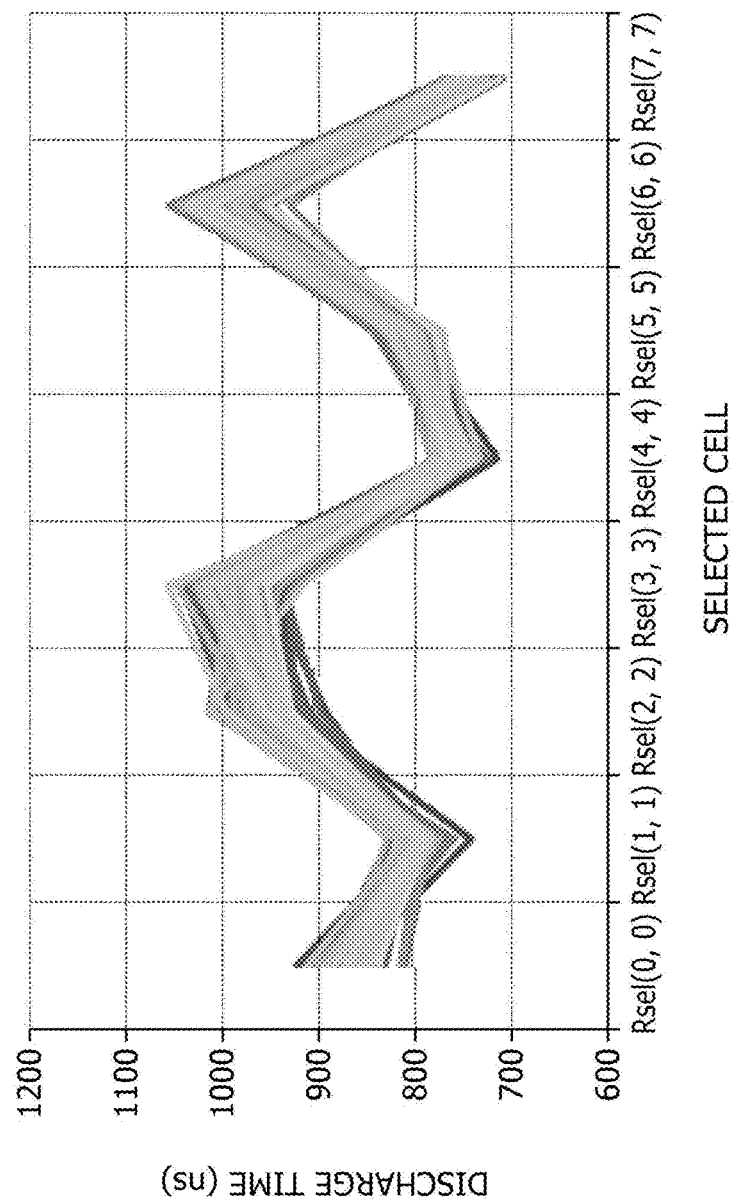
FIG. 12 is a graph illustrating increase/decrease patterns of a combined resistance when each of the memory cells on the diagonal line is designated as a main selection cell.

Based on the premise that the HR state and the LR state of each of the set memory cells vary randomly in accordance with a normal distribution, 100 types of pattern of the variation are created, and simulation is performed. FIG. 12 illustrates increase/decrease patterns of combined resistances resulting from the simulation when each memory cell on the diagonal line is designated as a main selection cell. In FIG. 12, 100 types of increase/decrease pattern are depicted superimposed. As can be understood from FIG. 12, although the absolute value of the combined resistance varies depending on variations in the set resistance state, the tendencies of the increase/decrease patterns exhibit a high degree of match. The group identification information generator 311 illustrated in FIG. 8 outputs such an increase/decrease pattern as digital data (RDO[7:0]). That is, the group identification information generator 311 compares the values of adjacent ones of input COUT0 to COUTm and outputs the transition of increases/decreases of the values as digital data (RDO[7:0]).

Figure 15:
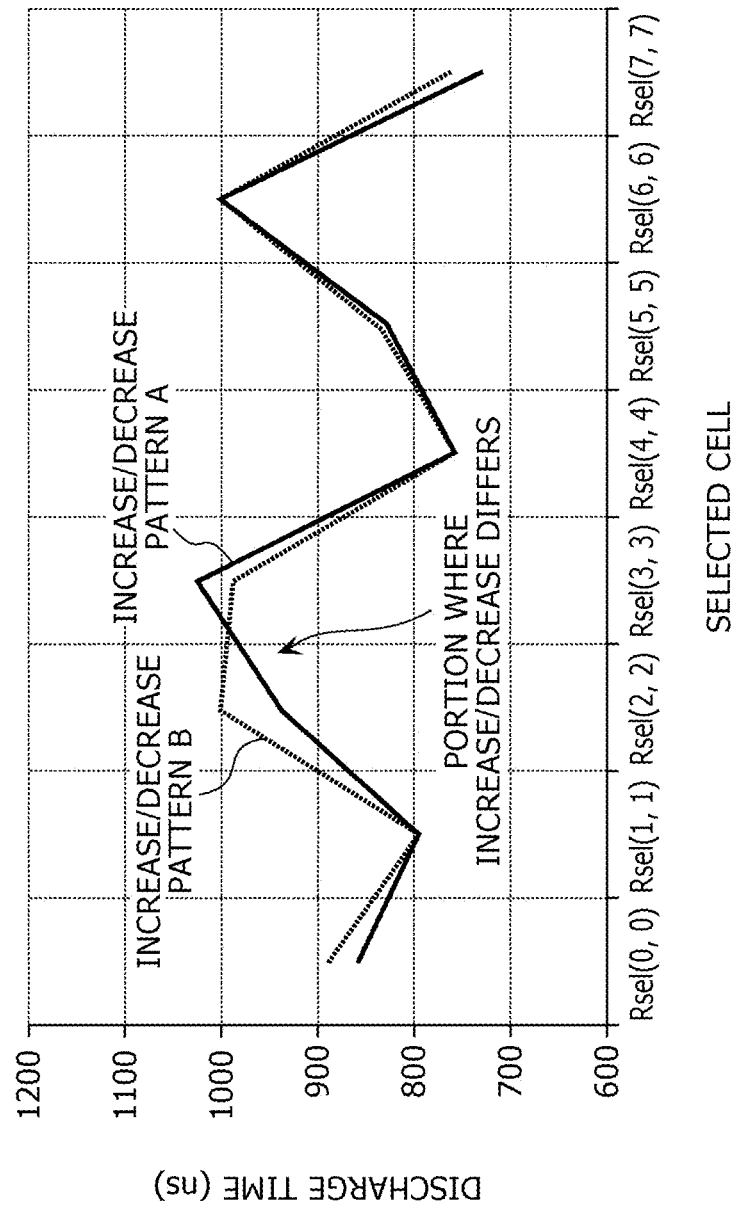
FIG. 15 is a graph illustrating two patterns of the increase/decrease patterns depicted superimposed in FIG. 12.

FIG. 15 is a graph when attention is given of two patterns of the increase/decrease patterns depicted superimposed in FIG. 12. When an increase/decrease pattern A in FIG. 15 is input to the group identification information generator 311, it is output as RDO[7:0]={10010010}. Most of the increase/decrease patterns in FIG. 12 correspond to the increase/decrease pattern A, thus making it possible to provide the same data. However, a fraction of the patterns become patterns like an increase/decrease pattern B owing to the difference depicted in the "portion where increase/decrease differs" in FIG. 15, data RDO[7:0]={10011010} in which one bit differs is output. Actual apparatuses have such variations in the combined resistances, and there are cases in which the increase/decrease patterns do not match exactly. In consideration of such an event, Hamming distance evaluation of RDO digital data is performed when a match of the increase/decrease patterns is to be verified. The Hamming distance evaluation provides an evaluation indicator indicating the degree of match between bits of digital data x and bits of digital data y and is given by:

$$\text{Hamming Distance } dH(x, y) = \sum_{i=1}^{n} \delta(xi, yi) \ldots \delta(xi, yi) = 1 @ xi \ne yi = 0 @ xi = yi$$

That is, when all bits are the same, the Hamming distance dH(x, y) is 0, and when all bits are different, the Hamming distance dH(x, y) is the bit length (in this example, 8) of RDO. Thus, evaluation as to whether or not the Hamming distance is smaller than a predetermined value makes it possible to evaluate the degree of match of RDO digital data. By performing such Hamming distance evaluation, a verifying circuit, which compare RDO data of appliances against each other (details of the comparison are described below) during authentication between the appliances, can stably perform actual-product authentication considering variations.

In the above description, based on the combined resistances when eight memory cells on the diagonal line in the memory cell array are designated as main selection cells and the other memory cells are designated as sub selection cells, the group identification information generator 311 generates a transition of the combined resistances as the group identification information. However, the method for generating the group identification information is not limited to the above-described method. The group identification information may be generated using the combined resistance of the memory cells that lie at positions different from those on a diagonal line. Also, the group identification information may be generated using the combined resistance when one or more memory cells other than eight memory cells (e.g., one memory cell or 16 memory cells) are designated as main selection cells. Information different from the transition of the combined resistance (e.g., information indicating the value or the range of the combined resistance) may be generated as the group identification information. That is, the group identification information generator 311 may be any generator that generates group identification information for identifying a device (e.g., the nonvolatile memory 300) as belonging to the same group as another device manufactured in the same process, by using at least one aggregate characteristic (e.g., a combined resistance) output from the aggregate-characteristic detectors (e.g., the sense amplifiers 306).

Figure 16:
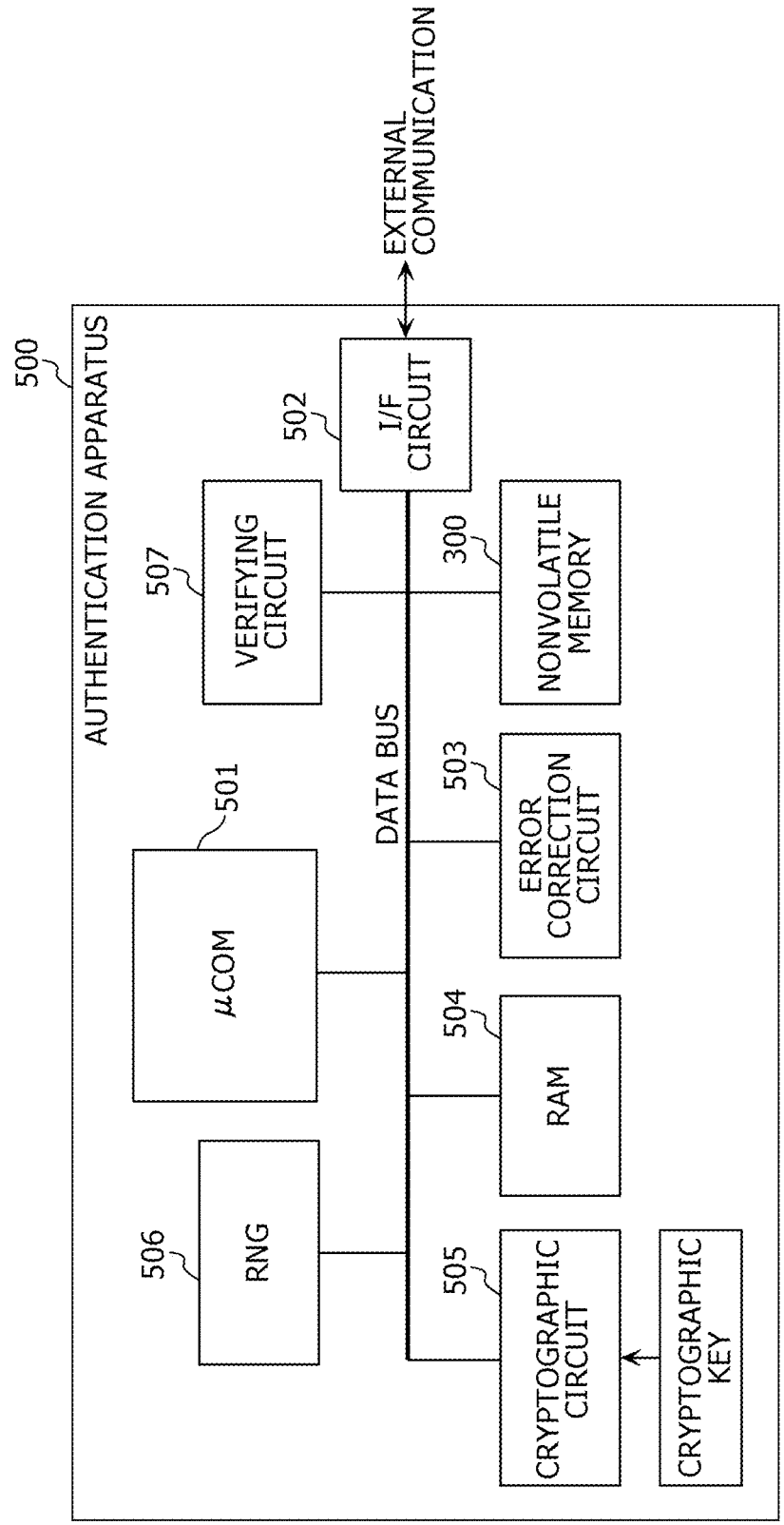
FIG. 16 is a block diagram illustrating one specific example of an authentication apparatus in the embodiment.

One specific example of the authentication apparatus 500 in the present disclosure will be described next with reference to the block diagram illustrated in FIG. 16. In FIG. 16, the authentication apparatus 500 includes a microcontroller (µCOM) 501 and an interface circuit (I/F circuit) 502. The µCOM 501 controls input/output data, sent from each block, through a data bus, and the interface circuit 502 obtains a command input via external communication and performs data input/output between an external apparatus and the data bus. The interface circuit 502 is one example of a transmitter that transmits combination information or group identification information to an authentication partner and a receiver that receives combination information or group identification information from an authentication partner.

Also, data is stored in and is read from the nonvolatile memory 300 through the data bus. An error correction circuit 503 is one example of an error correction circuit that generates error correction data for correcting error in the group identification information and that corrects error in the group identification information by using the generated error correction data. The error correction circuit 503 generates parity data for correcting error in data input through the data bus. The parity data is stored in a user data region in the nonvolatile memory 300. For correcting error in the group identification information, the error correction circuit 503 reads pre-stored parity data from the nonvolatile memory 300, the parity data and data including error are input to the error correction circuit 503, and then the error correction circuit 503 corrects the error in the input data to restore it to the data of the original normal group identification information on the basis of the relationship between the input data and parity data and outputs the corrected data. A random-access memory (RAM) 504 temporarily stores therein data for data input/output to/from each block. A cryptographic circuit 505 encrypts or decrypts data, input through the data bus, by using a cryptographic key and outputs the resulting data to the data bus.

A random-number generation circuit (RNG) 506 is one example of a combination information generator that generates combination information that indicates an arbitrary combination of physical characteristics of a plurality of elements manufactured on a semiconductor substrate and included in a device. Each time the RNG 506 receives a generation instruction from the μCOM 501, the RNG 506 generates a different random number (i.e., combination information) and outputs the random number to the data bus. A verifying circuit 507 is one example of an information verifier that compares first group identification information and second group identification information against each other. The verifying circuit 507 verifies the degrees of match between at least two pieces of data input through the data bus and outputs a result of the verification. All of the above-described blocks in the authentication apparatus 500 do not necessary have to be included therein, and some of the blocks may be eliminated depending on an authentication function described below. The nonvolatile memory 300 is substantially the same as the nonvolatile memory 300 illustrated in FIG. 2 and has a function for outputting RDO, which is group identification information, in addition to the typical data storage function.

Figure 17:
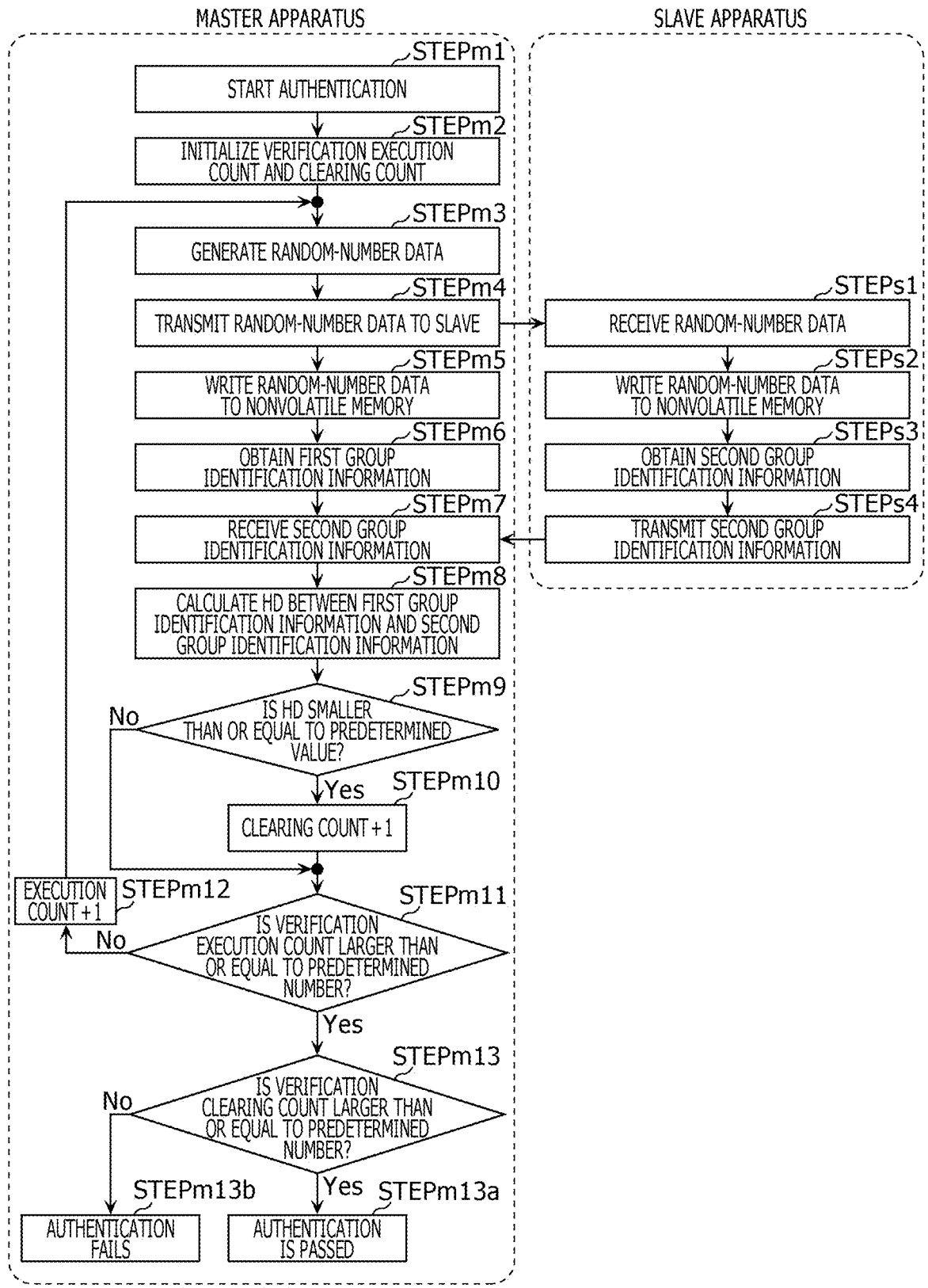
FIG. 17 is a flowchart illustrating an operation of the authentication apparatus.

Operations of a first authentication apparatus 500 and a second authentication apparatus 500 that have a configuration that is the same as or similar to the above-described authentication apparatus 500 in the present disclosure will be described below with reference to a flowchart illustrated in FIG. 17. In this case, it is assumed that the first authentication apparatus 500 serves a master, the second authentication apparatus 500 serves as a slave, and the master authenticates the slave (i.e., the slave is an authentication partner). That is, the first authentication apparatus 500 operates as an authentication master function, which realizes operations at the authenticating side, and the second authentication apparatus 500 operates as an authentication slave function, which realizes operations at the side to be authenticated. One authentication apparatus 500 may have both the authentication master function and the authentication slave function.

In the following description, the first authentication apparatus 500 is referred to as a "master apparatus (an apparatus that operates as an authentication master function)", and the second authentication apparatus 500 is referred to as a "slave apparatus (an apparatus that operates as an authentication slave function)". Processing performed by the master apparatus will be described with reference to FIG. 17. Authentication operation is started in response to an external command or a trigger from the μCOM 501 in the master apparatus (STEPm1). First, the μCOM 501 initializes a verification execution count and a verification match determination clearing count to zero (STEPm2). The μCOM 501 controls the random-number generation circuit 506 in FIG. 16 to generate random-number data as first combination information (a combination-information generating step) and temporarily stores the random-number data in the RAM 504 (STEPm3).

The μCOM 501 transmits the random-number data temporarily stored in the RAM 504 to the slave apparatus via the interface circuit 502 (a transmitting step STEPm4). Similarly, the μCOM 501 writes the temporarily stored random-number data in the RAM 504 to the nonvolatile memory 300 (STEPm5). In this case, in each memory array block 302, a random pattern of the HR state and the LR state is written to the memory cells other than the memory cells in the initial state in accordance with random-number data, as described above with reference to FIG. 9. That is, physical characteristics of a plurality of elements are set in accordance with the first combination information.

In addition, as described above, by using the nonvolatile memory 300, the μCOM 501 measures a combined resistance constituted by a resistance of each main selection cell and resistances of a group of sub selection cells corresponding thereto (an aggregate-characteristic detecting step) to thereby obtain first group identification information (a group-identification-information generating step) and temporarily stores the first group identification information in the RAM 504 (STEPm6). That is, the reading circuit 306 generates a first aggregate characteristic obtained by combining physical characteristics of a plurality of elements in the nonvolatile memory 300 in a state in which the physical characteristics of the elements are set in accordance with the first combination information. Based on the first aggregate characteristic, the group identification information generator 311 generates first group identification information for identifying the nonvolatile memory 300 as belonging to the same group as another nonvolatile memory manufactured in the same process.

In this case, the slave apparatus receives the random-number data, transmitted from the master apparatus in STEPm4, as second combination information (combination information received from the partner apparatus) (a receiving step) and temporarily stores the random-number data in the RAM 504 (STEPs1). In the present embodiment, the second combination information matches the first combination information generated by the master apparatus. In addition, the slave apparatus writes the random-number data, temporarily stored in the RAM 504, to the nonvolatile memory 300 (STEPs2). At this point in time, a pattern that is similar to the pattern (described above with reference to FIG. 9) in the master apparatus is written to each memory array block 302 in the slave apparatus. That is, a random pattern of data in the HR state and the LR state is written to the memory cells other than the memory cells in the initial state in accordance with random-number data.

That is, in the master apparatus and the slave apparatus, the same writing pattern is written to the memory array blocks 302 on the basis of the same random-number data. In addition, similarly to the master apparatus, the slave apparatus measures a combined resistance of the resistance of each main selection cell and the resistances of a group of sub selection cells corresponding thereto (an aggregate characteristic detecting step) to thereby obtain second group identification information (a group-identification-information generating step STEPs3). That is, physical characteristics of a plurality of elements are set in the nonvolatile memory 300 in the slave apparatus in accordance with the second combination information. In the state in which the physical characteristics are set, the reading circuit 306 generates a second aggregate characteristic obtained by combining the physical characteristics of the elements. Based on the second aggregate characteristic, the group identification information generator 311 generates second group identification information for identifying the nonvolatile memory 300 as belonging to the same group as another nonvolatile memory manufactured in the same process. The slave apparatus then transmits the second group identification information to the master apparatus (a transmission step STEPs4).

The master apparatus receives the second group identification information via the interface circuit 502 and temporarily stores the second group identification information in the RAM 504 (a receiving step STEPm7). Next, the verifying circuit 507, which is an information verifier, receives the first group identification information and the second group identification information temporarily stored in the RAM 504, calculates a Hamming distance (HD) between the data of the two pieces of identification information (an information verifying step), and temporarily stores the calculation result in the RAM 504 (STEPm8). The μCOM 501 reads the Hamming distance result temporarily stored in the RAM 504. The μCOM 501 increments a verification clearing count (STEPm10), upon determining that the Hamming distance is smaller than or equal to a predetermined value (Yes in STEPm9), and does not increment the verification clearing count, upon determining that the Hamming distance is larger than the predetermined value (No in STEPm9).

In addition, unless the verification execution count of the group identification information is larger than or equal to a predetermined number (No in STEPm11), the master apparatus increments the execution count (STEPm12), returns to STEPm3, and then repeats the flow. If the verification execution count is larger than or equal to the predetermined number (Yes in STEPm11), the master apparatus determines whether or not the verification clearing count is larger than or equal to a predetermined number (STEPm13). Upon determining that the verification clearing count is larger than or equal to a predetermined number (Yes in STEPm13), the master apparatus regards the identification information as a match and authenticates the slave apparatus as being an authentic apparatus (STEPm13a). If the verification clearing count is smaller than the predetermined number (No in STEPm13), the master apparatus determines that the authentication has failed and blocks the communication with the slave apparatus (STEPm13b).

As described above, based on the same random-number data, the master apparatus and the slave apparatus share the writing pattern of the HR state and the LR state in the memory array blocks in the nonvolatile memories having the same configuration (i.e., each of the master apparatus and the slave apparatus holds the writing pattern as the first combination information and the second combination information). It is difficult for other manufacturers to emulate a concealed manufacturing process involving know-how held by a limited manufacturer. Thus, it is not easy for other business operators to fabricate a clone. In addition, the combined resistance, which is an aggregate characteristic measured based on the writing pattern of the HR state and the LR state, is an aggregate characteristic of nonlinear resistance characteristics of the resistance variable elements, and is thus cannot be easily modeled. Hence, with an LSI (such as a microcomputer) having a computational function, it is difficult to create an imitation that performs impersonation by outputting group identification information that is equivalent to that of the slave apparatus.

Also, a large number of combinations due to random-number data that is combination information shared by the master apparatus and the slave apparatus are available as the group identification information used for the verification for the authentication. Hence, it is practically impossible to create an imitation that stores all combinations of group identification information and that generates group identification information. That is, according to the present embodiment, the master apparatus and the slave apparatus compare aggregate characteristics against each other, the aggregate characteristics being obtained by arbitrarily combining physical characteristics exhibited by devices produced in the manufacturing processes of the nonvolatile memories 300 included in the respective apparatuses. By doing so, each of the master apparatus and the slave apparatus authenticates that the nonvolatile memory 300 in the opposing apparatus belongs to a group including a plurality of nonvolatile memories created in a specific manufacturing process. In other words, each of the master apparatus and the slave apparatus authenticates that the nonvolatile memory 300 in the opposing apparatus is an authentic product created in a specific concealed manufacturing process.

This aggregate characteristic is a PUF in the sense of having a function by which the product cannot be physically duplicated by a manufacturer that cannot know the concealed manufacturing process. However, since the aggregate characteristic makes it possible to perform group authentication, which has not been realized by the PUF technologies of the related art, the aggregate characteristic is called "group authentication PUF", as described above. The group authentication PUF in the present disclosure is not limited to the resistance characteristics, which are physical characteristics of resistance variable elements used in a nonvolatile memory like that described above. The present disclosure encompasses any configuration including the following five constituent elements.

(1) A means that obtains an aggregate characteristic obtained by combining, on the basis of arbitrary combination information, physical characteristics of a device manufactured in a specific process, that is, an aggregate-characteristic detector that detects, when physical characteristics of a plurality of elements are set in accordance with the first combination information, a first aggregate characteristic obtained by combining the set physical characteristics of the elements;

(2) A means that transmits arbitrary combination information to an authentication partner, that is, a transmitter that transmits the first combination information to the authentication partner;

(3) A means that generates group identification information on the basis of the aggregate characteristic, that is, a group identification information generator that generates first group identification information for identifying a device as belonging to the same group as another device manufactured in the same process, on the basis of the first aggregate characteristic detected by the aggregate-characteristic detector;

(4) A receiving means that receives, from the authentication partner, group identification information generated based on the transmitted combination information, that is, a receiver that receives second group identification information that the authentication partner generates in accordance with the first combination information; and (5) A means that authenticates the authentication partner by verifying the degree of match between the group identification information generated by the group identification information generator and the group identification information received from the authentication partner, that is, an information verifier that compares the first group identification information and the second group identification information against each other.

(Modification of Authentication Scheme: Sharing of Cryptographic Key)

Next, another method using the group authentication PUF will be described with reference to the flowchart illustrated in FIG. 18. As in FIG. 17, it is assumed that a first authentication apparatus 500 and a second authentication apparatus 500 in the present disclosure are provided, the first authentication apparatus 500 serves as a master, the second authentication apparatus 500 serves as a slave, the master authenticates the slave, and key data for encryption and decryption are shared. That is, the first authentication apparatus 500 operates as an authentication master function that provides operations at an authenticating side, and the second authentication apparatus 500 operates as an authentication slave function that provides operations at a side to be authenticated. One authentication apparatus 500 may also have both the authentication master function and the authentication slave function.

Processing performed by the master apparatus will now be described with reference to FIG. 18. Authentication and a key-sharing operation are started in response to an external command or a trigger from the μCOM 501 in the master apparatus (STEPm14). First, the μCOM 501 initializes the verification execution count to zero (STEPm15). The μCOM 501 performs control to cause the random-number generation circuit 506 in FIG. 16 to generate random-number data as first combination information (a combination-information generating step) and to temporarily store the random-number data in the RAM 504 (STEPm3). The μCOM 501 reads the random-number data temporarily stored in the RAM 504 and transmits the random-number data to the slave apparatus via the interface circuit 502 (a transmitting step STEPm4).

Similarly, the μCOM 501 writes the random-number data, temporarily stored in the RAM 504, to the nonvolatile memory 300 (STEPm5). At this point in time, a random pattern of the HR state and the LR state is written to each memory array block 302, except for the memory cells in the initial state, in accordance with the random-number data, as described above with reference to FIG. 9. That is, physical characteristics of a plurality of elements are set in accordance with the first combination information. In addition, the μCOM 501 measures a combined resistance constituted by a resistance of each main selection cell and resistances of a group of sub selection cells corresponding thereto (an aggregate characteristic detecting step) to thereby obtain first group identification information and temporarily stores the first group identification information in the RAM 504 (STEPm6). Based on the first group identification information, the error correction circuit 503 generates parity data of the first group identification information as error correction data for correcting error in the first group identification information (an error correcting step). The error correction circuit 503 transmits the generated parity data to the slave apparatus (STEPm16).

The slave apparatus receives the random-number data, transmitted from the master apparatus in STEPm4, as second combination information (combination information received from the partner apparatus) (a receiving step) and temporarily stores the random-number data in the RAM 504 (STEPs1). In the present embodiment, the second combination information matches the first combination information generated by the master apparatus. The slave apparatus further writes the random-number data, temporarily stored in the RAM 504, to the nonvolatile memory 300 (STEPs2).

In this case, in each memory array block 302 in the slave apparatus, a random pattern of the HR state and the LR state is written to the memory cells other than the memory cells in the initial state, in accordance with the random-number data, as in the master apparatus described above with reference to FIG. 9. That is, in the master apparatus and the slave apparatus, the same writing pattern is written to each memory array block 302 on the basis of the same random-number data. As in the master apparatus, the slave apparatus further measures a combined resistance constituted by a resistance of each main selection cell and resistances of a group of sub selection cells corresponding thereto (an aggregate-characteristic detecting step) to thereby obtain second group identification information (a group-identification-information generating step) and temporarily stores the second group identification information in the RAM 504 (STEPs3).

Next, the slave apparatus receives the parity data from the master apparatus and temporarily stores the parity data in the RAM 504 (STEPs5). The error correction circuit 503 receives the parity data and the second group identification information temporarily stored in the RAM 504. By using the parity data, the error correction circuit 503 corrects data error in the second group identification information to obtain data that is the same as the first group identification information held by the master apparatus (an error correcting step). The true group identification information in which the error was corrected is temporarily stored in the RAM 504 as a shared cryptographic key (STEPs6).

In this case, when data error that is greater than or equal to the error correction capability is included in the second group identification information, the data error is not completely corrected, and the second group identification information does not match the first group identification information held by the master apparatus. When the first group identification information and the second group identification information do not match each other, verification described below does not indicate a match, and thus the authentication and the key sharing fail. In addition, the cryptographic circuit 505 receives the shared cryptographic key temporarily stored in the RAM 504 in STEPs6 and the random-number data temporarily stored in the RAM 504 in STEPs1, uses the shared cryptographic key to encrypt the random-number data (an encrypting step), and temporarily stores the encrypted random-number data in the RAM 504 (STEPs7). The encrypted random-number data temporarily stored in the RAM 504 is transmitted to the master apparatus via the interface circuit 502 (STEPs8).

The master apparatus then receives the encrypted random-number data via the interface circuit 502 and temporarily stores the encrypted random-number data in the RAM 504 (STEPm17). The cryptographic circuit 505 in the master apparatus receives the encrypted random-number data temporarily stored in the RAM 504 and the first group identification information generated in STEPm6. The cryptographic circuit 505 decrypts the encrypted random-number data into the original random-number data by using the first group identification information as a shared cryptographic key (a decrypting step) and temporarily stores the original random-number data in the RAM 504 (STEPm18). The verifying circuit 507 receives the random-number data generated and temporarily stored in the RAM 504 in STEPm3 and the random-number data decrypted in STEPm18 and verifies a match between the two pieces of random-number data (STEPm19). In this case, since it is sufficient to verify whether or not the two pieces of random-number data match each other exactly, the verification may be simple data comparison or may be checking whether or not the Hamming distance is zero. The verifying circuit 507 temporarily stores a verification result, obtained using any of the methods, in the RAM 504.

In this case, if the verification result temporarily stored in the RAM 504 indicates a match (Yes in STEPm19), the μCOM 501 determines that the authentication and the key sharing have succeeded and stores the shared cryptographic key in the nonvolatile memory 300 (STEPm22). As a result, the authentication and the key sharing are completed (STEPm23). If the verification result indicates a mismatch (No in STEPm19), the μCOM 501 determines whether or not the verification execution count is larger than or equal to a predetermined number (STEPm20). If the verification execution count is smaller than the predetermined value (No in STEPm20), the μCOM 501 increments the verification execution count (STEPm21) and returns to STEPm3. If the verification execution count is larger than or equal to the predetermined number (Yes in STEPm20), the μCOM 501 determines that the authentication and the key sharing have failed and blocks the communication with the slave apparatus (STEPm24).

According to the scheme described above, the cryptographic key can be shared simultaneously with authentication using the group authentication PUF. When the features of the group authentication PUF are considered, only apparatuses including devices (the nonvolatile memories 300) manufactured in a specific manufacturing process by a specific manufacturer can share a cryptographic key in a secure manner. When a cryptographic key can be shared in a secure manner, the security can be ensured by performing encrypted communication using the shared cryptographic key. In general, an attack that compromises a cryptographic key requires time and effort. When the authentication and the key sharing which use the above-described group authentication PUF are periodically performed, and a cryptographic key to be shared is updated, the security of the cryptographic key increases dramatically. The advantage of this scheme is that the number of times data is written to the nonvolatile memory for the group authentication PUF can be significantly reduced. Since nonvolatile memories are generally limited in the number of times data is written, the merit of avoiding writing random-number data each time authentication is performed is large.

Figure 18:
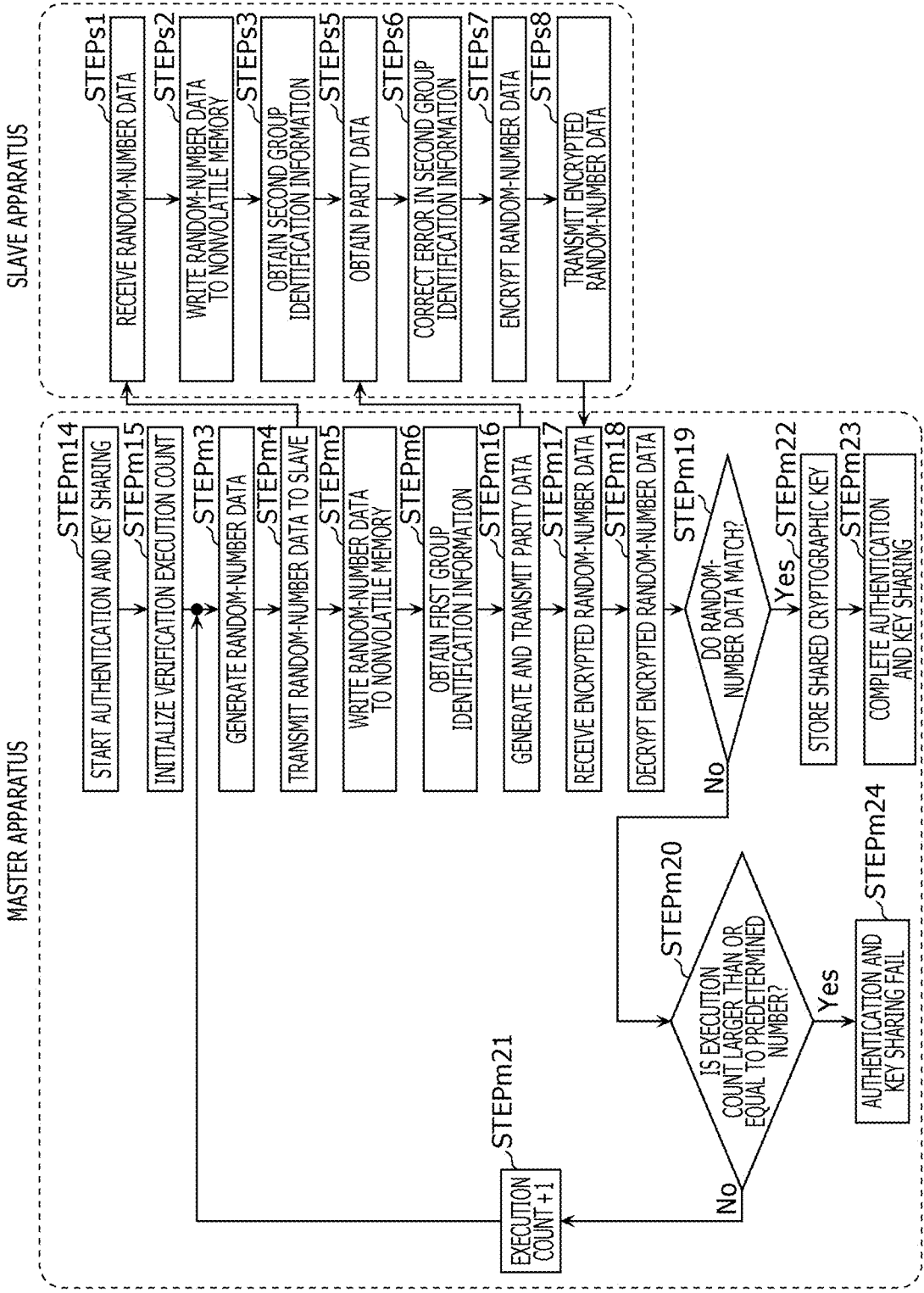
FIG. 18 is a flowchart illustrating another operation of the authentication apparatus.

In the scheme illustrated in FIG. 18, once the cryptographic key can be shared, writing to the nonvolatile memory for authentication is not needed until a next update of the cryptographic key, and the authentication in the period between the sharing and the update can be replaced with an encrypted communication using the cryptographic key. From the point of view of security, it is desirable that the cryptographic key shared in FIG. 18 be periodically updated to a different cryptographic key, as described above. Although the timing of the update is a design issue depending on the system and/or application, the update may be triggered by a time period (e.g., each week or month) based on an internal or external timer of the authentication apparatus or may be triggered by an event, for example, when the slave apparatus is replaced with another slave apparatus. Although data that is a basis for encryption using the cryptographic key shared in STEPs7 in FIG. 18 is random-number data obtained in STEPs1, the data is not limited to the random-number data. The data may be arbitrary constant data pre-stored in the apparatus. Examples of the data include user-specific recognition symbol data, serial number data, and apparatus model-number data. All of the blocks illustrated in FIG. 16 do not necessary have to be included in a single IC, and it is sufficient as long as a combination of ICs can realize the functions of the present disclosure as a whole product.

(Modification of Configuration of Memory Array Blocks in Nonvolatile Memory)

Figure 19:
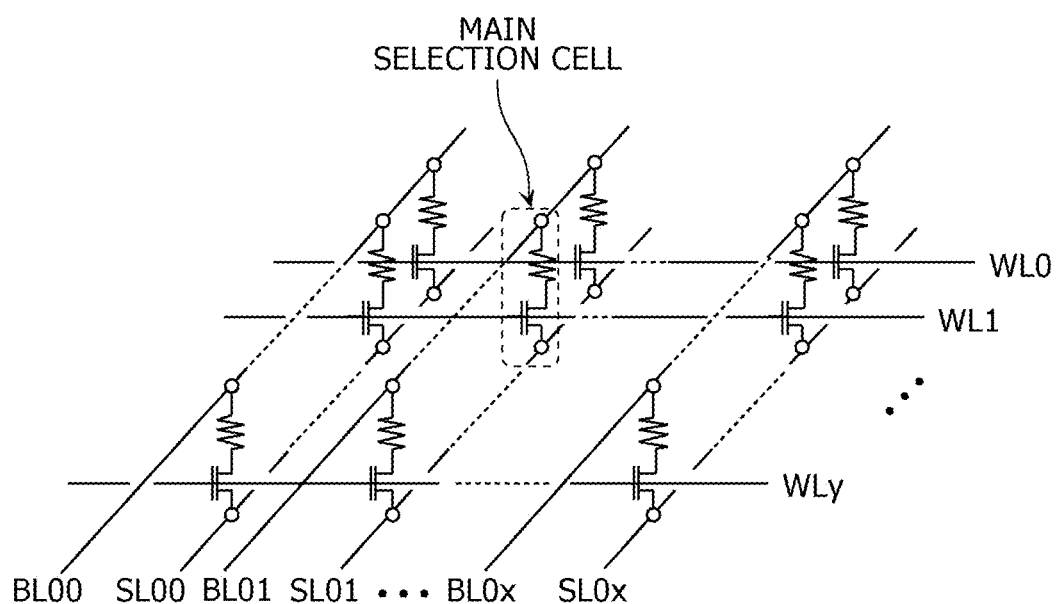
FIG. 19 is a schematic diagram depicting a memory array block of type B in a three-dimensional manner.

In the memory array blocks 302 described above with reference to FIGS. 2 and 4, the word lines and the source lines are parallel to each other, and the bit lines are arranged so as to be orthogonal to the word lines and the source lines. The memory cells are arranged in respective areas where the word lines and the source lines intersect the bit lines in a three-dimensional manner in a wiring layer different from that of the bit lines. An array block having such a relationship is referred to as "type A", and an array block having a relationship as illustrated in FIG. 19 is referred to as "type B". In the memory array block of type B in FIG. 19, pairs of bit lines and source lines, each pair consisting of one bit line and one source line that are parallel to each other, are arranged parallel to each other, and word lines are arranged so as to be orthogonal to the pairs of bit lines and source lines, as can be understood from FIG. 19.

Figure 20:
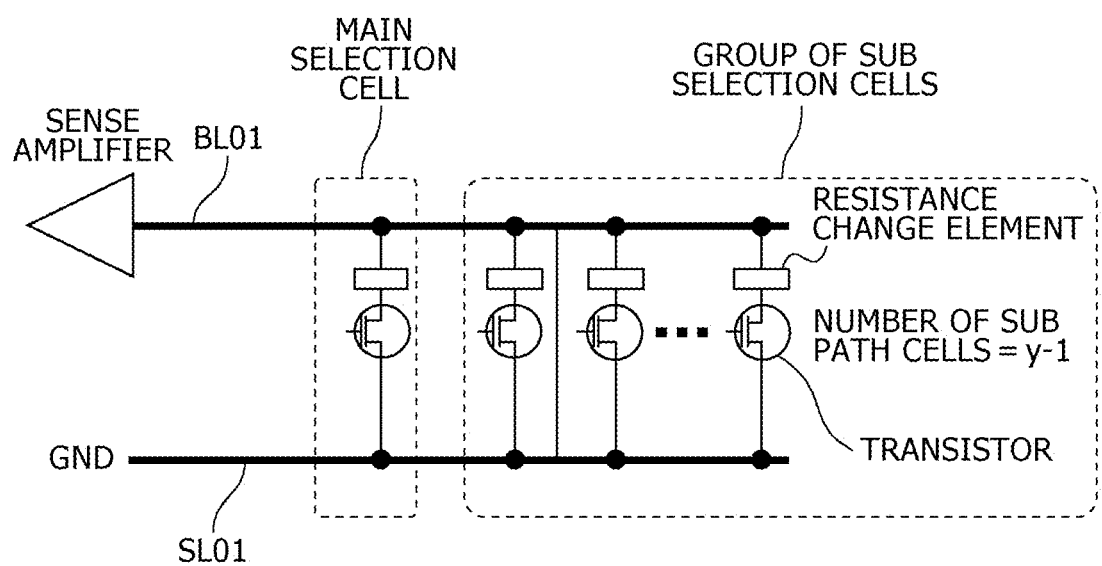
FIG. 20 is an equivalent circuit diagram illustrating current paths in a group of sub selection cells in the memory array block in FIG. 19.

That is, in the nonvolatile memory of type B, a plurality of bit lines BL00 to BL0x, a plurality of source lines SL0 to SLx arranged parallel to the bit lines BL00 to BL0x, a plurality of word lines WL0 to WLy that intersect the bit lines BL00 to BL0x and the source lines SL0 to SLx are provided, and memory cells are arranged at the areas of the respective intersections. Since the memory array blocks 302 illustrated in FIG. 2 are type A, the one-or-more-rows selecting circuit/driver 303, which is a row selecting circuit, is in charge of selecting any of the source lines, but for type B, the column selecting circuit 304 is in charge of selecting any of the source lines. Since this is a design issue, illustration in a figure is omitted. For example, when the memory cell surrounded by a dotted line in FIG. 19 is assumed to be a main selection cell, the bit line BL01 is connected to the sense amplifier 306 via the column selecting circuit 304. When two or more of the word lines are put into a selected state, a simple memory-cell parallel circuit is formed as in an equivalent circuit diagram depicting current paths in a group of sub selection cells illustrated in FIG. 20, thereby making it relatively easier to predict the combined resistance.

Figure 21:
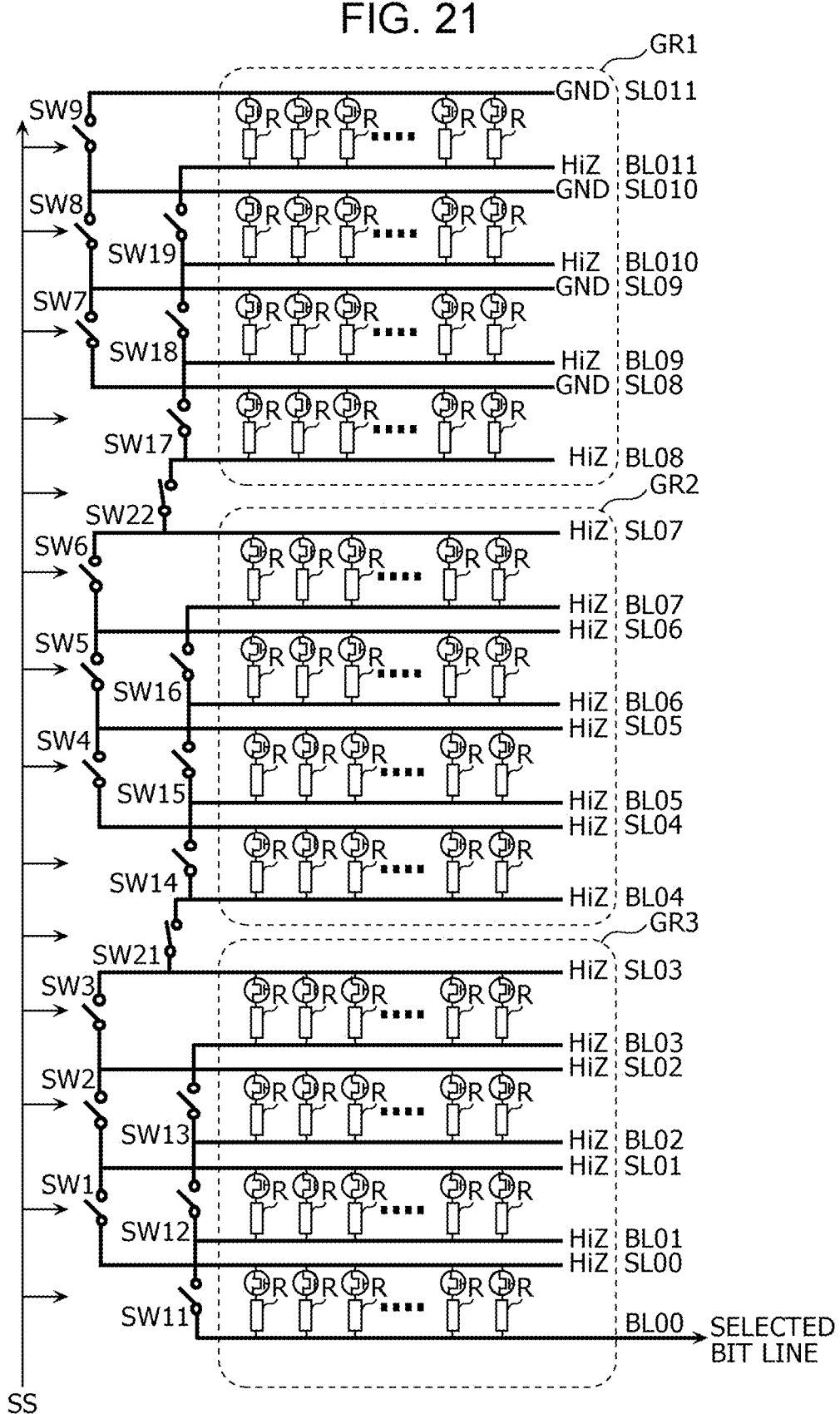
FIG. 21 is a diagram illustrating one example of the circuit configuration of a memory array block of type B when authentication is performed using a group authentication PUF.

FIG. 21 illustrates, as an approach for improvement, one example of the circuit configuration of a memory array block when the group authentication PUF is performed using type B. FIG. 21 is a schematic diagram in which word lines are not illustrated, bit lines and source lines are arranged parallel to each other, and memory cells are connected therebetween. Although FIG. 21 illustrates an example in which 12 bit lines BL000 to BL011 are arranged and 12 source lines SL000 to SL011 are arranged, the present disclosure is not limited thereto. In FIG. 21, all of the bit lines and the source lines are connected to corresponding short circuits for the group identification information.

The short circuit for the group identification information includes a first short circuit having switches SW1 to SW9, a second short circuit having switches SW11 to SW19, and a third short circuit having switches SW21 and SW22. The switches SW1 to SW9 can provide connections between the corresponding source lines in respective groups GR3 to GR1 surrounded by dashed lines. The switches SW11 to SW19 can provide connections between the corresponding bit lines in the respective groups GR3 to GR1. The switch SW21 can provide a connection between the source line SL03 in the group GR3 and the bit line BL04 in the group GR2, and the switch SW22 can provide a connection between the source line SL07 in the group GR2 and the bit line BL08 in the group GR1.

The μCOM 501 controls the switches SW1 to SW9, SW11 to SW19, and SW21 and SW22 via a terminal SS illustrated in FIG. 21. During data storage to and data reproduction from a typical nonvolatile memory, the switches SW1 to SW9, SW11 to SW19, and SW21 and SW22 are open, and the memory cells can be individually accessed. As described above, when the group identification information is read, the switches SW1 to SW9, SW11 to SW19, and SW21 and SW22 are short-circuited.

Figure 22:
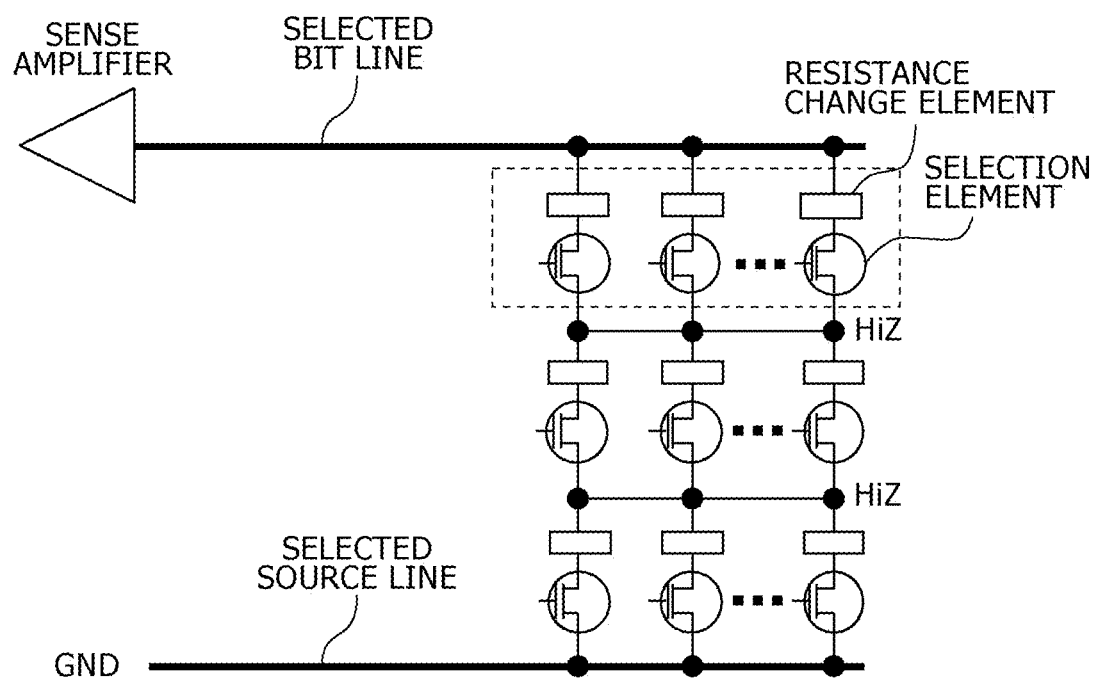
FIG. 22 is an equivalent circuit diagram illustrating current paths in a sub selection cell group in the memory array block in FIG. 21.

When the switches SW1 to SW9, SW11 to SW19, and SW21 and SW22 are short-circuited, an equivalent circuit depicting current paths in a group of sub selection cells, as illustrated in FIG. 22, can be configured. As can be understood from FIG. 22, three stages, each including a plurality of memory cells connected in parallel, are connected in series, thus making it possible to obtain complicated routes as conduction paths. In this case, when all of the memory cells in one group (surrounded by a dotted line in FIG. 22) of memory cell groups are put into the initial state, it is possible to obtain a combined resistance having very high nonlinearity. This makes it possible to obtain group identification information that is significantly difficult to model. The conduction path configuration is not limited to the three-stage conduction path configuration illustrated in FIG. 22. Various combinations are possible depending on the configuration of the switches in the short circuits for the group identification information.

The authentication apparatus according to the present disclosure obtains group identification information by using an aggregate characteristic obtained by combining, based on arbitrary combination information, physical characteristics of a device created in a specific manufacturing process by a specific manufacturer. Use of such group identification information to perform mutual authentication between apparatuses makes it possible to provide an unprecedented authentication apparatus that is difficult to clone. This authentication apparatus is useful for, for example, an authenticity determination as to whether or not a consumable product is an authentic product in authentication between an electrical product and the consumable product. Examples of the authentication include authentication between an electrical product and a battery and authentication between a printer and an ink cartridge.

What is claimed is:

1. An authentication apparatus, comprising:
   a combination information generator that generates first combination information indicating a combination of physical characteristics of at least two of first elements included in a first semiconductor device;
   a group identification information generator that generates first group identification information based on the combination of the physical characteristics of the at least two of the first elements, the first group identification information being for identifying the first semiconductor device as belonging to a same group as another semiconductor device manufactured in a same process;
   a transmitter that transmits the first combination information to an authentication partner;
   a receiver that receives second group identification information that the authentication partner generates in accordance with the first combination information;
   an information verifier that compares the first group identification information with the second group identification information; and
   an aggregate-characteristic detector that detects a first aggregate characteristic,
   wherein the first semiconductor device is a nonvolatile resistive memory including resistance variable elements as the first elements;
   wherein the authentication apparatus has an authentication master function to authenticate the authentication partner and an authentication slave function to be authenticated;
   wherein, in the authentication master function,
   the combination information generator generates first random-number data to be written to the nonvolatile resistive memory as the first combination information,
   after the first random-number data generated by the combination information generator is written to the nonvolatile resistive memory, the aggregate-characteristic detector detects a first combined resistance of resistance characteristics of at least two of the resistance variable elements as the first aggregate characteristic,
   the group identification information generator generates first digital data as the first group identification information, based on the first combined resistance,
   the transmitter transmits the first random-number data to the authentication partner,
   the receiver receives second digital data as the second group identification information that the authentication partner generates in accordance with the first random-number data, and
   the information verifier verifies a match between the first digital data and the second digital data; and
   wherein, in the authentication slave function,
   the receiver receives, from the authentication partner, second random-number data to be written to the nonvolatile resistive memory as second combination information,
   after the second random-number data received by the receiver is written to the nonvolatile resistive memory, the aggregate-characteristic detector detects a second combined resistance of resistance characteristics of at least two of the resistance variable elements as a second aggregate characteristic,
   the group identification information generator generates third digital data as third group identification information, based on the second combined resistance, and
   the transmitter further transmits the third digital data to the authentication partner.

2. The authentication apparatus according to claim 1,
   wherein the first aggregate characteristic is obtained by combining the physical characteristics of the at least two of the first elements in accordance with the first combination information generated by the combination information generator, and
   wherein the group identification information generator generates the first group identification information, based on the first aggregate characteristic detected by the aggregate-characteristic detector.

3. The authentication apparatus according to claim 2,
   wherein the receiver receives the second combination information generated by the authentication partner;
   the aggregate-characteristic detector detects the second aggregate characteristic obtained by combining physical characteristics of at least two of the first elements in accordance with the second combination information received by the receiver;
   the group identification information generator generates the third group identification information based on the second aggregate characteristic, the third group identification information being for identifying the first semiconductor device as belonging to the same group as the other semiconductor device manufactured in the same process, and
   the transmitter transmits the third group identification information to the authentication partner.

4. The authentication apparatus according to claim 1, further comprising:
   an error correction circuit that generates error correction data for correcting error in the first group identification information and that corrects the error in the first group identification information by using the error correction data; and a cryptographic circuit that generates a cryptographic key based on the first group identification information and that encrypts or decrypts data by using the cryptographic key.

5. The authentication apparatus according to claim 1, wherein the group identification information generator generates the first digital data as the first group identification information, based on a transition of the first combined resistance in at least two portions in the nonvolatile resistive memory and generates the third digital data as the third group identification information, based on a transition of the second combined resistance in at least two portions in the nonvolatile resistive memory.

6. The authentication apparatus according to claim 5, wherein the information verifier verifies the match by calculating a Hamming distance between the first digital data and the second digital data.

7. The authentication apparatus according to claim 1, wherein each of the resistance variable elements has three states including (a) an initial state in which the resistance variable element has a resistance value within a predetermined resistance-value range, (b) a high-resistance state in which the resistance variable element has a resistance value that is smaller than the resistance value in the initial state and that is within a predetermined resistance-value range, and (c) a low-resistance state in which the resistance variable element has a resistance value that is smaller than the resistance value in the high-resistance state and that is within a predetermined resistance-value range;

each of the resistance variable elements is adapted to reversibly change between the high-resistance state and the low-resistance state upon application of a predetermined voltage pulse; and at least one of the resistance variable elements related to the first or second combined resistance is in the initial state.

8. The authentication apparatus according to claim 1, further comprising a selecting circuit, wherein the aggregate-characteristic detector comprises a reading circuit, the nonvolatile resistive memory includes memory cells each of which includes one of the resistance variable elements and a selector electrically connected to the resistance variable element, the selector has a first selection terminal, a second selection terminal, and a third selection terminal and controls an amount of current flowing between the first selection terminal and the second selection terminal in accordance with a potential of the third selection terminal, each of the resistance variable elements has a first terminal and a second terminal and has a resistance value that changes according to a value of a voltage applied across the first terminal and the second terminal and an application direction of the applied voltage, the first selection terminal of the selector is connected to the second terminal of the resistance variable element, the nonvolatile resistive memory includes bit lines and pairs of source lines and word lines that intersect the bit lines, each pair comprising one source line and one word line, and the memory cells are arranged to correspond to areas where the pairs of source lines and word lines intersect the bit lines, in each of the memory cells, the first terminal of the resistance variable element is connected to the corresponding bit line, the second terminal of the selector is connected to the corresponding source line, and the third selection terminal is connected to the corresponding word line, the selecting circuit selects at least one of the bit lines, selects at least two of the word lines, and applies a voltage to each of the selected at least two word lines, and the reading circuit directly or indirectly measures an amount of current flowing from the selected at least one bit line to at least two source lines corresponding to the selected at least two word lines, and detects the first or second combined resistance, based on a result of the measurement.

9. The authentication apparatus according to claim 1, further comprising a selecting circuit, wherein the aggregate-characteristic detector comprises a reading circuit, the nonvolatile resistive memory includes memory cells each of which includes one of the resistance variable elements and a selector electrically connected to the resistance variable element, the selector includes a first selection terminal, a second selection terminal, and a third selection terminal and controls an amount of current flowing between the first selection terminal and the second selection terminal in accordance with a potential of the third selection terminal, each of the resistance variable elements has a first terminal and a second terminal and has a resistance value that changes according to a value of a voltage applied across the first terminal and the second terminal and an application direction of the applied voltage, the first selection terminal of the selector is connected to the second terminal of the resistance variable element, the nonvolatile resistive memory includes pairs of bit lines and source lines, each pair comprising one bit line and one source line arranged parallel to each other, and word lines that intersect the pairs of bit lines and source lines, and the memory cells are arranged to correspond to areas where the word lines intersect the pairs of bit lines and source lines, in each of the memory cells, the first terminal of the resistance variable element is connected to the corresponding bit line, the second terminal of the selector is connected to the corresponding source line, and the third selection terminal is connected to the corresponding word line, the nonvolatile resistive memory further includes a first short circuit that interconnects at least two of the bit lines according to a first predetermined combination, a second short circuit that interconnects at least two of the source lines according to a second predetermined combination, and a third short circuit that connects the at least two of the bit lines to the at least two of the source lines according to a third predetermined combination, the selecting circuit selects at least one of the bit lines and applies a predetermined voltage to at least one of the word lines, and the reading circuit directly or indirectly measures an amount of current flowing from the selected at least one bit line to at least one source line corresponding to the selected at least one bit line, and detects the first or second combined resistance, based on a result of the measurement.

10. The authentication apparatus according to claim 1,
wherein the nonvolatile resistive memory includes memory cells,
each of the memory cells includes a first electrode, a second electrode, and resistance variable element having a resistance change layer located between the first electrode and the second electrode, and
the resistance change layer has a state of providing insulation between the first electrode and the second electrode.

11. The authentication apparatus according to claim 10,
wherein the resistance change layer has a conduction path that penetrates the resistance change layer.

12. The authentication apparatus according to claim 10,
wherein the resistance change layer is made of material containing a metal oxide.

13. The authentication apparatus according to claim 12,
wherein the resistance change layer is made of material containing an oxygen-deficient metal oxide.

14. The authentication apparatus according to claim 12,
wherein the metal oxide is at least one selected from the group consisting of a transition metal oxide and an aluminum oxide.

15. The authentication apparatus according to claim 12,
wherein the metal oxide is at least one selected from the group consisting of a tantalum oxide, a hafnium oxide, and a zirconium oxide.

16. The authentication apparatus according to claim 11,
wherein the conduction path has an oxygen-deficient metal oxide having a lower oxygen content than the resistance change layer.

\* \* \* \* \*